(12) United States Patent
Favor et al.

(10) Patent No.: US 11,836,498 B1
(45) Date of Patent: Dec. 5, 2023

(54) SINGLE CYCLE PREDICTOR

(71) Applicant: Ventana Micro Systems Inc., Cupertino, CA (US)

(72) Inventors: John G Favor, San Francisco, CA (US); Michael N. Michael, Folsom, CA (US)

(73) Assignee: Ventana Micro Systems Inc., Cupertino, CA (US)

( * ) Notice: Subject to any disclaimer, the term of this patent is extended or adjusted under 35 U.S.C. 154(b) by 2 days.

(21) Appl. No.: 17/879,281

(22) Filed: Aug. 2, 2022

(51) Int. Cl.
  *G06F 9/38*  (2018.01)
  *G06F 9/30*  (2018.01)

(52) U.S. Cl.
  CPC ........ *G06F 9/3806* (2013.01); *G06F 9/30058* (2013.01)

(58) Field of Classification Search
  CPC .................................................... G06F 9/3806
  See application file for complete search history.

(56) References Cited

U.S. PATENT DOCUMENTS

| | | |
|---|---|---|
| 5,235,697 A | 8/1993 | Steely, Jr. et al. |
| 5,418,922 A | 5/1995 | Liu |
| 5,434,985 A | 7/1995 | Emma et al. |
| 5,692,152 A | 11/1997 | Cohen et al. |
| 6,016,533 A | 1/2000 | Tran |
| 6,134,654 A | 10/2000 | Patel et al. |
| 6,356,990 B1 | 3/2002 | Aoki et al. |
| 6,418,525 B1 | 7/2002 | Charney et al. |
| 7,493,480 B2 | 2/2009 | Emma et al. |
| 8,825,955 B2 | 9/2014 | Sleiman et al. |
| 8,959,320 B2 | 2/2015 | Beaumont-Smith et al. |
| 9,367,471 B2 | 6/2016 | Blasco-Allue et al. |
| 9,983,878 B2 | 5/2018 | Levitan et al. |
| 10,157,137 B1 | 12/2018 | Jain et al. |
| 10,613,869 B2 | 4/2020 | Greenhalgh et al. |
| 10,740,248 B2 | 8/2020 | Campbell et al. |
| 10,747,539 B1 | 8/2020 | Hakewill et al. |
| 11,372,646 B2 | 6/2022 | Chirca et al. |
| 11,687,343 B2 | 6/2023 | Ishii et al. |

(Continued)

OTHER PUBLICATIONS

Tang, Weiyu et al. "Integrated I-cache Way Predictor and Branch Target Buffer to Reduce Energy Consumption." International Symposium on High Performance Computing. 2009. pp. 1-8.

(Continued)

*Primary Examiner* — Michael J Metzger
(74) *Attorney, Agent, or Firm* — E. Alan Davis; Huffman Law Group, PC

(57) ABSTRACT

A predictor includes a memory having a plurality of entries. Each entry includes a prediction of a hash of a next fetch address produced by a fetch block J of a series of successive fetch blocks in program execution order and a branch direction produced by the fetch block J. An input selects an entry for provision on the output. The output is fed back to the input such that the output provides the prediction of the hash of the next fetch address and the branch direction produced by each fetch block over a series of successive clock cycles. The hash of the next fetch address is insufficient for use by an instruction fetch unit to fetch from an instruction cache a fetch block J+1, whereas the next fetch address itself is sufficient for use by the instruction fetch unit to fetch from the instruction cache the fetch block J+1.

25 Claims, 10 Drawing Sheets

(56) References Cited

U.S. PATENT DOCUMENTS

| | | |
|---|---|---|
| 2006/0095680 A1 | 5/2006 | Park et al. |
| 2008/0215865 A1 | 9/2008 | Hino et al. |
| 2009/0037709 A1* | 2/2009 | Ishii ................... G06F 9/3844 |
| | | 712/240 |
| 2012/0290821 A1 | 11/2012 | Shah et al. |
| 2015/0100762 A1 | 4/2015 | Jacobs |
| 2016/0117153 A1* | 4/2016 | Salmon-Legagneur ................... |
| | | G06F 8/433 |
| | | 717/155 |
| 2017/0109289 A1 | 4/2017 | Gonzalez Gonzalez et al. |
| 2017/0286421 A1* | 10/2017 | Hayenga ............... G06F 16/172 |
| 2019/0163902 A1* | 5/2019 | Reid ................... G06F 12/1009 |
| 2020/0104137 A1* | 4/2020 | Natarajan ............. G06F 9/3848 |
| 2020/0150968 A1* | 5/2020 | Fatehi ................... G06F 9/3842 |

OTHER PUBLICATIONS

Zhu, Zhichun et al. "Access-Mode Predictions for Low-Power Cache Design." in IEEE Micro, vol. 22, No. 2. pp. 58-71. Year 2002.
Yu, Chun-Chang et al. "Power Reduction of a Set-Associative Instruction Cache Using a Dynamic Early Tag Lookup." Design, Automation & Test in Europe Conference & Exhibition (DATE). Grenoble, France. 2021. pp. 1799-1802.

\* cited by examiner

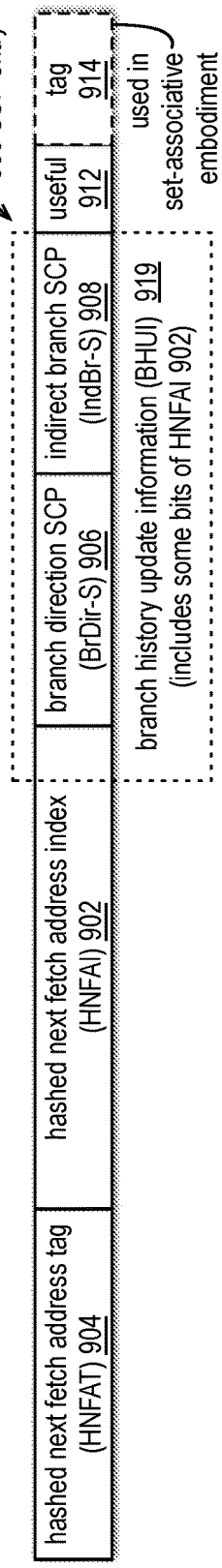
*FIG. 9*
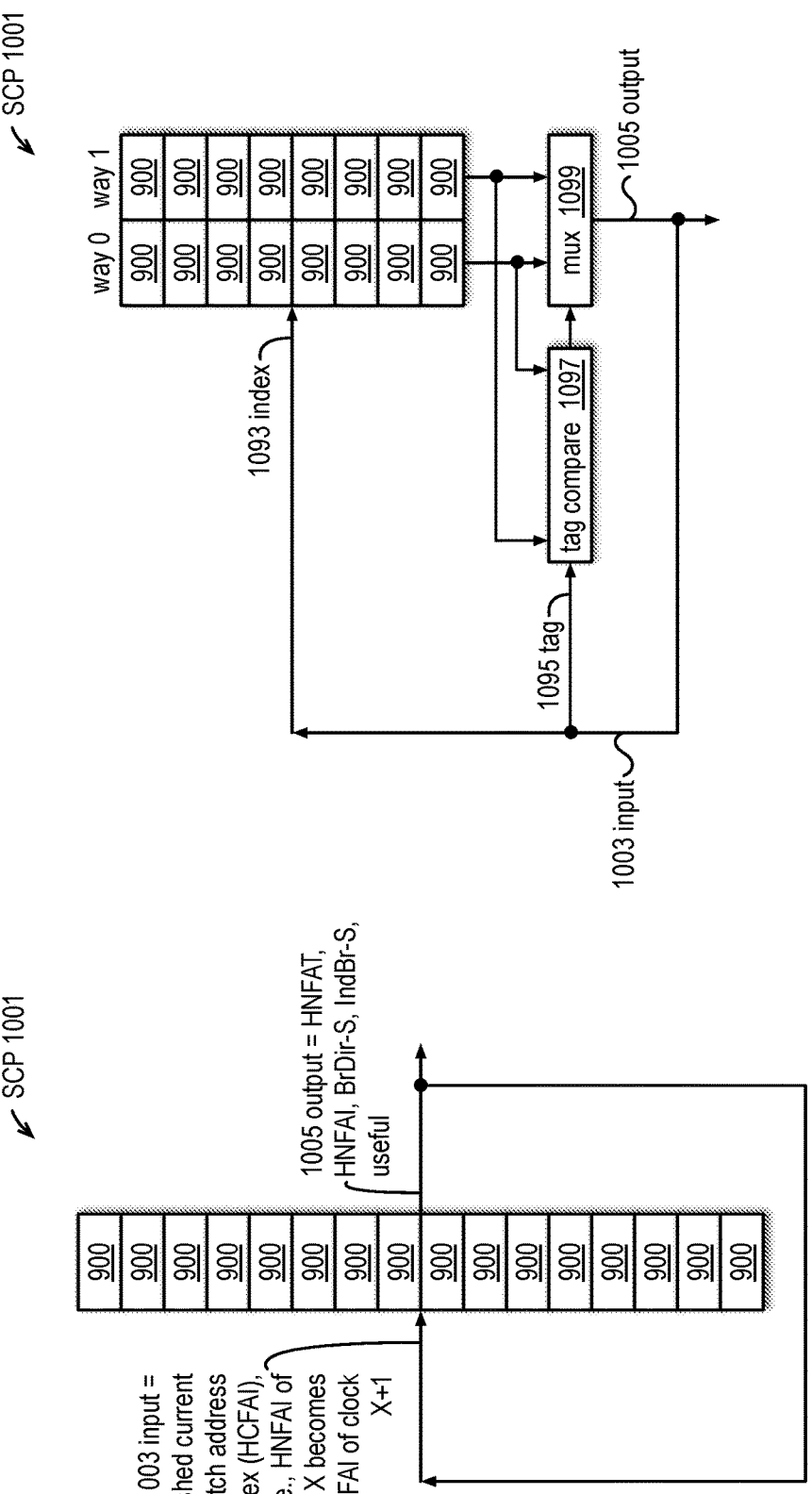
*FIG. 10A*
*FIG. 10B*

FIG. 12

← 102 PRU pipeline stages

| PR1 1201 | PR2 1202 | PR3 1203 | PR4 1204 | PR5 1205 |
|---|---|---|---|---|
| Access SCP to obtain HNFAI, HNFAT, BrDir-S, IndBr-S produced by previous FBlk. SCP is accessed using output (e.g., portion of HNFAI) of SCP provided during immediately previous clock cycle and fed back to SCP input. | Use BrDir-S, IndBr-S, and HNFAI bits and current branch history (e.g., GHist, CPHist, IPHist) to produce updated branch history. Hash updated branch history with HNFAI and HNFAT to generate indexes and tags used to access FBPU structures (e.g., CBP and IBP). Use PR2 as setup time for BTB, CBP, IBP, RAP RAM structure accesses (RAP may be flip-flop structure). Update current branch history using BrDir-S, IndBr-S, and HNFAI bits. | Use HNFAI and indexes generated in PR2 to initiate access of FBPU RAM structures to obtain BTB hit, predicted set index, predicted way number, FBlk length, PC-relative target address, termination type, conditional branch direction, indirect branch target address, and return target address. Start BTB tag comparisons using HNFAT obtained in PR1 and use tags generated in PR2 to start CBP/IBP tag comparisons and table selections. | Finish tag comparisons and evaluation of table-based predictors to obtain BTB/CBP/IBP/RAP predictions. Form fetch address of next FBlk (next FVA, i.e., next FA produced by current FBlk), based on BTB/CBP/IBP/RAP predictions and fetch address of current FBlk (current FVA). Next FBlk is FBlk immediately succeeding current FBlk in program execution order. Current FVA is next FA of previous FBlk generated in PR4 during previous clock cycle and fed back to PR4 in this clock cycle. Predict BrDir-F/IndBr-F produced by current FBlk based on predictions of termination type, FBlk length, and conditional branch direction. Form FBD of current FBlk and push into FBD FIFO. Update restoration branch history with predicted BrDir-F/IndBr-F. Update RAP. | To check for possible SCP mis-prediction: (1) compare "correct" BrDir-F/IndBr-F produced by current FBlk as predicted by the FBPU against BrDir-S/IndBr-S obtained from SCP produced by the current FBlk as predicted by SCP in PR1 3 clock cycles earlier and fed forward to PR5 this clock cycle; (2) hash next FVA produced by current FBlk as predicted by the FBPU to generate "correct" HNFAI and HNFAT, then compare against HNFAI and HNFAT obtained from SCP produced by the current FBlk as predicted by SCP in PR1 3 clock cycles earlier and fed forward to PR5 this clock cycle. If SCP mis-predicted: flush PRU pipeline, train SCP, restore current branch history from restoration branch history, restart PRU using "correct" next FBlk information. |

SINGLE CYCLE PREDICTOR

BACKGROUND

A processor includes a program counter (PC) that specifies the virtual address of the next instruction of the program to be fetched and executed. Many processors also include an instruction cache that caches blocks of instructions previously fetched from system memory to reduce instruction fetch time. Instruction blocks are typically fetched from the instruction cache using a physical address rather than the PC virtual address. Typically, the instruction cache is set associative. That is, the instruction cache is arranged as multiple sets, and each set has multiple ways, each way having an entry. One set is selected by a set index portion of the physical address. Each valid entry of the ways of the selected set includes a tag that is compared against a tag portion of the physical address to determine which way the physical address hits upon, if any, i.e., which entry's tag matches the tag portion of the physical address. The set associative arrangement may improve the performance of the instruction cache, typically measured as a hit rate. The performance improvement may be a reduction in the likelihood that a recently used and therefore likely needed again soon instruction block is replaced by a different new instruction block whose physical address aliases to the same set of the instruction cache. This is because the new instruction block may be allocated into a different way of the aliased set than the recently used instruction block to instead replace a less recently used instruction block.

The process of fetching a block of instructions from a physically-indexed physically-tagged set associative instruction cache essentially involves a series of steps. First, the virtual fetch address is translated into a physical fetch address. Next, a set index portion of the physical fetch address is used to select a set of the instruction cache. Then, a tag portion of the physical fetch address is compared against the tags of each entry in the selected set to determine which way, if any, the physical fetch address hits in. Finally, the instruction block of the hit way determined by the tag comparison is read out for provision to other units of the processor for further processing.

As may be inferred from the above, the instruction fetch process may be lengthy. One cause of the lengthy process is that the address translation, way determination, and data read out steps typically involve access to memory structures that may involve significant access times. For example, the address translation is typically performed by a translation lookaside buffer (TLB), which is itself a cache memory, as is the instruction cache. The instruction cache itself may include multiple memory structures. For example, the instruction cache may include one memory structure for storing the tags and another memory structure for storing the instruction blocks. In the case of high frequency processor designs, to access a memory structure may require longer than a single clock cycle, depending upon the size of the memory structure. As a result, pipeline stages are typically implemented in processors that operate at a high clock frequency, resulting in an instruction fetch pipeline.

Another cause of the lengthy instruction fetch process is that the address translation, instruction cache way determination, and instruction cache data read out steps are performed sequentially. Thus, in addition to the long memory structure access time, the sequential nature of the steps of the instruction fetch process lend themselves to an instruction fetch pipeline. Indeed, modern instruction fetch pipelines may be several stages in length.

Although pipelining the instruction fetch process may have advantages, such as facilitating high processor clock frequency, there are disadvantages associated with a long instruction fetch pipeline. High performance processors typically make predictions about the control flow of a program. For example, a processor may make predictions about branch instructions. More specifically, the processor may predict the presence or absence of a branch instruction in the instruction stream, whether a conditional branch instruction will be taken or not taken, and the target address of a branch instruction. The branch predictions enable the processor to continue fetching instructions without having to wait for the fetched instructions to be executed. If later (e.g., after execution of a predicted branch instruction) the processor realizes it made a misprediction, it will flush the instructions that were fetched down the incorrectly predicted path and begin fetching instructions down the correct path. The length of the instruction fetch pipeline can be a major contributor to the latency from detection of the misprediction to the provision of the correctly fetched instructions to the execution units of the processor. During the latency, the execution units are idle, which is harmful to processor performance.

SUMMARY

In one embodiment, the present disclosure provides a predictor comprising a memory comprising a plurality of entries. Each of the plurality of entries comprises a prediction of a hash of a next fetch address produced by a fetch block J of a series of successive fetch blocks in program execution order and a branch direction produced by the fetch block J. The predictor also comprises an output and an input that selects an entry of the plurality of entries for provision on the output. At least a portion of the output is fed back to the input such that the output provides the prediction of the hash of the next fetch address and the branch direction produced by each fetch block of the series of successive fetch blocks over a series of successive clock cycles. The hash of the next fetch address produced by the fetch block J is insufficient for use by an instruction fetch unit to fetch from an instruction cache a fetch block J+1 of the series of successive fetch blocks, whereas the next fetch address produced by the fetch block J is sufficient for use by the instruction fetch unit to fetch from the instruction cache the fetch block J+1.

In another embodiment, the present disclosure provides a method with respect to a memory comprising a plurality of entries, wherein each of the plurality of entries comprises a prediction of a hash of a next fetch address produced by a fetch block J of a series of successive fetch blocks in program execution order and a branch direction produced by the fetch block J, and an output and an input that selects an entry of the plurality of entries for provision on the output. The method includes feeding back at least a portion of the output to the input such that the output provides the prediction of the hash of the next fetch address and the branch direction produced by each fetch block of the series of successive fetch blocks over a series of successive clock cycles. The hash of the next fetch address produced by the fetch block J is insufficient for use by an instruction fetch unit to fetch from an instruction cache a fetch block J+1 of the series of successive fetch blocks, whereas the next fetch address produced by the fetch block J is sufficient for use by the instruction fetch unit to fetch from the instruction cache the fetch block J+1.

In yet another embodiment, the present disclosure provides a non-transitory computer-readable medium having instructions stored thereon that are capable of causing or configuring a predictor comprising a memory comprising a plurality of entries. Each of the plurality of entries comprises a prediction of a hash of a next fetch address produced by a fetch block J of a series of successive fetch blocks in program execution order and a branch direction produced by the fetch block J. The predictor also comprises an output and an input that selects an entry of the plurality of entries for provision on the output. At least a portion of the output is fed back to the input such that the output provides the prediction of the hash of the next fetch address and the branch direction produced by each fetch block of the series of successive fetch blocks over a series of successive clock cycles. The hash of the next fetch address produced by the fetch block J is insufficient for use by an instruction fetch unit to fetch from an instruction cache a fetch block J+1 of the series of successive fetch blocks, whereas the next fetch address produced by the fetch block J is sufficient for use by the instruction fetch unit to fetch from the instruction cache the fetch block J+1.

BRIEF DESCRIPTION OF THE DRAWINGS

FIG. 9 is an example block diagram of a single-cycle predictor entry in accordance with embodiments of the present disclosure.

FIG. 10A is an example block diagram of a single-cycle predictor in accordance with embodiments of the present disclosure.

FIG. 10B is an example block diagram of a single-cycle predictor in accordance with alternate embodiments of the present disclosure.

FIG. 12 is an example block diagram illustrating stages of the pipeline of the prediction unit of FIG. 11 in accordance with embodiments of the present disclosure.

DETAILED DESCRIPTION

Figure 1:
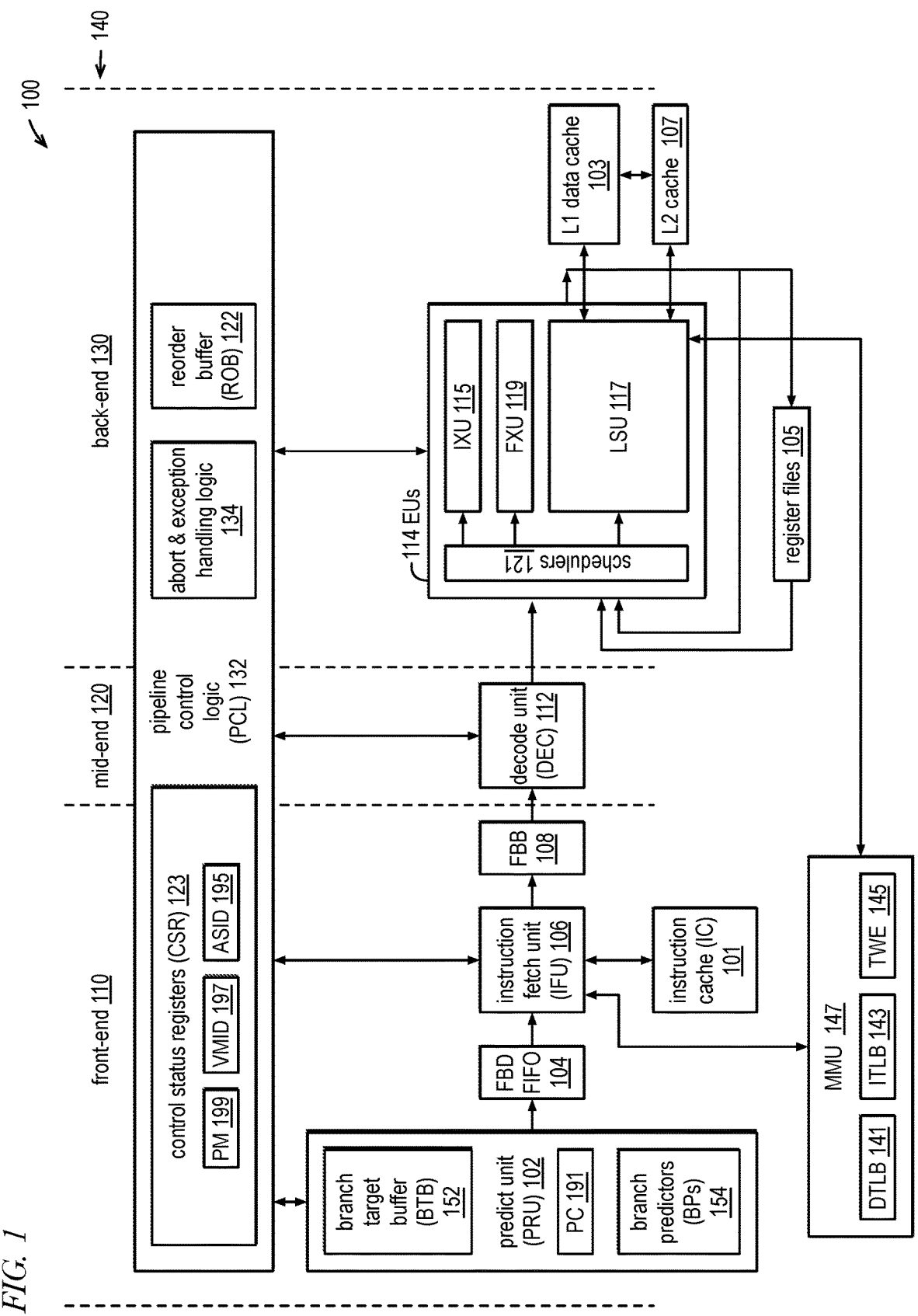
FIG. 1 is an example block diagram of a microprocessor core in accordance with embodiments of the present disclosure.

Embodiments are described in which each entry of a branch target buffer (BTB) stores a small additional amount of information to facilitate shortening the instruction fetch pipeline of the processor. More specifically, the small amount of information cached in the BTB is the set index and way number that specify the entry of the instruction cache from which the desired instruction block was recently fetched. The BTB-predicted set index and way number are used to independently access the instruction cache data random access memory (RAM) to obtain the desired instruction block without needing to wait for the address translation and instruction cache way determination steps to be performed first. That is, in parallel with initiation of the instruction cache data RAM access using the BTB-predicted set index and way number, the instruction fetch pipeline initiates access to the instruction TLB (ITLB) and initiates access to the instruction cache tag RAM using the BTB-predicted set index. Thus, the physical fetch address, which includes the correct set index, and the correct way number are obtained in parallel with the fetch of the instruction block and used to check correctness of the predicted set index and way number. In this manner, the instruction fetch pipeline is effectively shortened, or folded as described more below, to the number of stages required to access the data RAM to obtain the instruction block.

Embodiments are also described in which the short instruction fetch pipeline operates in the parallel manner described above while the BTB continues to provide set index and way number predictions but dynamically lengthens/unfolds in response to a BTB miss such that the ITLB, tag RAM, and data RAM accesses are performed serially. In one embodiment, the instruction fetch pipeline dynamically folds back up when the BTB hits again. In the case of a BTB miss, a new entry in the BTB may be created after the correct set index and way number are determined. Other events that cause the instruction fetch pipeline to unfold may include a set index misprediction by the BTB or a miss in the ITLB or instruction cache.

Each BTB entry stores only translated address bits of the instruction cache set index, and untranslated bits of the fetch virtual address are used to provide the remainder of the set index. Advantageously, by storing a relatively small number of additional bits per BTB entry (e.g., in one embodiment, 5 bits of set index and 2 bits of way number), the instruction fetch pipeline may be folded, i.e., shortened (e.g., from 6 stages to 2 stages), for a significant percentage of time, i.e., approximately the BTB hit rate. The shortening of the instruction fetch pipeline may improve processor performance by reducing the latency and penalty associated with branch mispredictions or other causes of restart of the instruction fetch pipeline.

Further advantageously, the instruction fetch pipeline may be shortened/folded while also obtaining the power saving benefit of reading out only a single way of the instruction cache data RAM per instruction block fetch. That is, in an approach taken by a conventional processor to shorten the instruction fetch pipeline, the pipeline reads out the instruction blocks from all N ways of the selected set of the data RAM in parallel with the tag RAM lookup that determines the correct way, and then the pipeline selects one of the N instruction blocks using the correct way. The conventional approach consumes significantly more power than the approach taken by the embodiments described herein that, in parallel with the tag RAM access, read out only the single way of the data RAM predicted by the BTB. The power savings may be particularly significant in embodiments in which the amount of bytes per data RAM entry is large.

FIG. 1 is an example block diagram of a microprocessor core 100 in accordance with embodiments of the present disclosure. The processor 100 includes a branch target buffer (BTB) 152 that holds instruction cache set index and way number predictions used to operate an instruction fetch pipeline in a folded mode. The instruction fetch pipeline is also dynamically operable between the folded mode and an unfolded mode.

Although a single core 100 is shown, the folded/unfolded instruction fetch pipeline techniques described herein are not limited to a particular number of cores. Generally, the folded/unfolded instruction fetch pipeline embodiments may be employed in a processor conforming to various instruction set architectures (ISA), including but not limited to, x86, ARM, PowerPC, SPARC, MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the folded/unfolded instruction fetch pipeline techniques are not generally limited to RISC-V.

The core 100 has an instruction pipeline 140 that includes a front-end 110, mid-end 120, and back-end 130. The front-end 110 includes an instruction cache 101, a predict unit (PRU) 102, a fetch block descriptor (FBD) FIFO 104, an instruction fetch unit (IFU) 106, and a fetch block (FBlk) FIFO 108. The mid-end 120 include a decode unit (DEC) 112.

The back-end 130 includes a level-1 (L1) data cache 103, a level-2 (L2) cache 107, a register files 105, and a plurality of execution units (EU) 114. In one embodiment, the register files 105 include an integer register file, a floating-point register file and a vector register file. In one embodiment, the register files 105 include both architectural registers as well as microarchitectural registers. In one embodiment, the EUs 114 include integer execution units (IXU) 115, floating point units (FXU) 119, and a load-store unit (LSU) 117.

The core 100 also includes a memory management unit (MMU) 147 coupled to the IFU 106 and LSU 117. The MMU 147 includes a data translation lookaside buffer (DTLB) 141, an instruction translation lookaside buffer (ITLB) 143, and a table walk engine (TWE) 145. The ITLB 143 translates a fetch virtual address into a fetch physical address that is used to fetch a block of instructions from the instruction cache 101, as described below.

The microprocessor 110 may also include other blocks not shown, such as a load buffer, a bus interface unit, and various levels of cache memory above the instruction cache 101 and L1 data cache 103 and L2 cache 107, some of which may be shared by other cores of the processor. Furthermore, the core 100 may be multi-threaded in the sense that it includes the ability to hold architectural state (e.g., program counter, architectural registers) for multiple threads that share the back-end 130, and in some embodiments the mid-end 120 and front-end 110, to perform simultaneous multithreading (SMT).

The core 100 provides virtual memory support. Each process, or thread, running on the core 100 may have its own address space identified by an address space identifier (ASID). The core 100 may use the ASID to perform address translation. For example, the ASID may be associated with the page tables, or translation tables, of a process. The TLBs (e.g., DTLB 141 and ITLB 143) may include the ASID in their tags to distinguish entries for different processes. In the x86 ISA, for example, an ASID may correspond to a processor context identifier (PCID).

The core 100 may also provide machine virtualization support. Each virtual machine running on the core 100 may have its own virtual machine identifier (VMID). The TLBs may include the VMID in their tags to distinguish entries for different virtual machines. Finally, the core 100 provides different privilege modes (PM) 199, or privilege levels. The PM 199 of the core 100 determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes exception levels (EL0, EL1, EL2 and EL3).

Pipeline control logic (PCL) 132 is coupled to and controls various aspects of the pipeline 140 which are described in detail herein. The PCL 132 includes a ReOrder Buffer (ROB) 122, abort and exception-handling logic 134, and control and status registers (CSR) 123. The CSRs 123 hold, among other things, the PM 199, VMID 197, and ASID 195 of the core 100. In one embodiment (e.g., in the RISC-V ISA), the current PM 199 does not reside in a software-visible CSR 123; rather, the PM 199 resides in a micro-architectural register. However, the previous PM 199 is readable by a software read of a CSR 123 in certain circumstances, such as upon taking of an exception. In one embodiment, the CSRs 123 may hold a VMID 197 and ASID 195 for each PM.

The pipeline units may signal a need for an abort, e.g., in response to detection of a mis-prediction (e.g., by a branch predictor of a direction or target address of a branch instruction, or of a mis-prediction that store data should be forwarded to a load Op in response to a store dependence prediction) or other microarchitectural exception, architectural exception, or interrupt. In response, the PCL 132 may assert flush signals to selectively flush instructions/Ops from the various units of the pipeline 140.

The PRU 102 maintains the program counter (PC) 191 and includes predictors that predict program flow that may be altered by control flow instructions, such as branch instructions. In one embodiment, the PRU 102 includes the BTB 152 and branch predictors (BPs) 154. In one embodiment, the BPs 154 include a main conditional branch predictor, a secondary conditional branch predictor, an indirect branch predictor, and a return address predictor. As a result of predictions made by the predictors, the core 100 may speculatively execute instructions in the instruction stream of the predicted path.

The PRU 102 generates fetch block descriptors (FBD) that are provided to the FBD FIFO 104 in a first-in-first-out manner. Each FBD describes a fetch block (FBlk or FB), also referred to herein as a block of instructions, or an instruction block. An FBlk is a sequential set of instructions. In one embodiment, an FBlk is up to sixty-four bytes long and may contain as many as thirty-two instructions. An FBlk ends with either a branch instruction to be predicted, an instruction that causes a PM change or that requires heavy abort-based synchronization (aka "stop" instruction), or an indication that the run of instructions continues sequentially into the next FBlk. An FBD is essentially a request to fetch instructions, e.g., referred to in FIG. 5 as a fetch request 511. An FBD (e.g., as described below with respect to FIG. 3) may include the address and length of an FBlk and an indication of the type of the last instruction. The IFU 106 uses the FBDs to fetch FBlks into the FBlk FIFO 108, which feeds fetched instructions to the DEC 112. The FBD FIFO 104 enables the PRU 102 to continue predicting FBDs to reduce the likelihood of starvation of the IFU 106. Likewise, the FBlk FIFO 108 enables the IFU 106 to continue fetching FBlks to reduce the likelihood of starvation of the DEC 112. By design, the last instruction of an FBlk can be a branch instruction, a privilege-mode-changing instruction, or a stop instruction. Instructions may travel through the pipeline 140 from the IFU 106 to the DEC 112 as FBlks, where they are decoded in parallel.

The DEC 112 may decode architectural instructions of the FBlks into micro-operations, referred to herein as Ops. The DEC 112 dispatches Ops to the schedulers 121 of the EUs 114. The schedulers 121 schedule and issue the Ops for execution to the execution pipelines of the EUs, e.g., IXU 115, FXU 119, LSU 117. The EUs 114 receive operands for the Ops from multiple sources including: results produced by the EUs 114 that are directly forwarded on forwarding busses—also referred to as result busses or bypass busses—back to the EUs 114 and operands from the register files 105 that store the state of architectural registers as well as microarchitectural registers, e.g., renamed registers. In one embodiment, the EUs 114 include four IXU 115 for executing up to four Ops in parallel, two FXU 119, and an LSU 117 that is capable of executing up to four load/store Ops in parallel. The instructions are received by the DEC 112 in program order, and entries in the ROB 122 are allocated for the associated Ops of the instructions in program order. However, once dispatched by the DEC 112 to the EUs 114, the schedulers 121 may issue the Ops to the individual EU 114 pipelines for execution out of program order.

The PRU 102, IFU 106, DEC 112, and EUs 114, along with the intervening FIFOs 104 and 108, form a concatenated pipeline 140 in which instructions and Ops are processed in mostly sequential stages, advancing each clock cycle from one stage to the next. Each stage works on different instructions in parallel. The ROB 122 and the schedulers 121 together enable the sequence of Ops and associated instructions to be rearranged into a data-flow order and to be executed in that order rather than program order, which may minimize idling of EUs 114 while waiting for an instruction requiring multiple clock cycles to complete, e.g., a floating-point Op or cache-missing load Op.

Many structures within the core 100 address, buffer, or store information for an instruction or Op by reference to an FBlk identifier. In one embodiment, checkpoints for abort recovery are generated for and allocated to FBlks, and the abort recovery process may begin at the first instruction of the FBlk containing the abort-causing instruction.

In one embodiment, the DEC 112 converts each FBlk into a series of up to eight OpGroups. Each OpGroup consists of either four sequential Ops or, if there are fewer than four Ops in the FBlk after all possible four-op OpGroups for an FBlk have been formed, the remaining Ops of the FBlk. Because some Ops can be fused from two instructions, an OpGroup may correspond to up to eight instructions. The Ops of the OpGroup may be processed in simultaneous clock cycles through later DEC 112 pipe stages, including rename and dispatch to the EU 114 pipelines. Instructions of an OpGroup are also allocated into the ROB 122 in simultaneous clock cycles and in program order. The instructions of an OpGroup are not, however, necessarily scheduled for execution together.

In one embodiment, each of the EUs 114 includes a dedicated scheduler 121. In an alternate embodiment, a scheduler 121 common to all the EUs 114 (and integrated with the ROB 122 according to one embodiment) serves all the EUs 114. In one embodiment, each scheduler 121 includes an associated buffer (not shown) that receives Ops dispatched by the DEC 112 until the scheduler 121 issues the Op to the relevant EU 114 pipeline for execution, namely when all source operands upon which the Op depends are available for execution and an EU 114 pipeline of the appropriate type to execute the Op is available.

The PRU 102, IFU 106, DEC 112, each of the execution units 114, and PCL 132, as well as other structures of the core 100, may each have their own pipeline stages in which different operations are performed. For example, in one embodiment, the DEC 112 has a pre-decode stage, an extract stage, a rename stage, and a dispatch stage.

The PCL 132 tracks instructions and the Ops into which they are decoded throughout their lifetime. The ROB 122 supports out-of-order instruction execution by tracking Ops from the time they are dispatched from DEC 112 to the time they retire. In one embodiment, the ROB 122 has entries managed as a FIFO, and the ROB 122 may allocate up to four new entries per cycle at the dispatch stage of the DEC 112 and may deallocate up to four oldest entries per cycle at Op retire. In one embodiment, each ROB entry includes an indicator that indicates whether the Op has completed its execution and another indicator that indicates whether the result of the Op has been committed to architectural state. More specifically, load and store Ops may be committed subsequent to completion of their execution. Still further, an Op may be committed before it is retired.

Embodiments of a PRU 102 and IFU 106 are described herein that advantageously facilitate operation of an instruction fetch pipeline in a folded fashion to reduce instruction fetch latency while still enjoying the benefit of reduced power consumption by reading out a single way of the instruction cache data RAM.

Figure 2:
FIG. 2 is an example block diagram of an entry of the BTB of FIG. 1 in accordance with embodiments of the present disclosure.

FIG. 2 is an example block diagram of a BTB entry 200, i.e., an entry of the BTB 152 of FIG. 1, in accordance with embodiments of the present disclosure. The BTB entry 200 includes a BTB tag 202, a predicted set index 204, a predicted way number 206, a fetch block length 208, a PC-relative target address 212, and a termination type 214. As described below with respect to FIGS. 5 and 6, a value of the PC 191 of FIG. 1 is used as a fetch virtual address (FVA), e.g., FVA 512 of FIG. 5, to fetch a block of instructions from the instruction cache 101. Prior to the instruction block fetch, the FVA is also used to access the BTB 152, as described below with respect to FIGS. 4 and 6. If the FVA missed in the BTB 152, a new BTB entry 200 will be created and allocated into the BTB 152 based on the FVA, the set and way of the instruction cache 101 from which the block of instructions was fetched, and other information determined from decode and execution of the fetched block of instructions, e.g., as described below with respect to block 632 of FIG. 6.

The BTB tag 202 of the new BTB entry 200 is based on the FVA that was used to fetch the block of instructions from the instruction cache 101. In one embodiment, the BTB tag 202 is a hash of bits of the FVA, the VMID 197, and the PM 199, e.g., a hash that may be performed by BTB access logic 401 of FIG. 4. However, other embodiments are contemplated in which the BTB entry 200 is based on the FVA in other manners, e.g., simply upper bits of the FVA.

Figure 5:
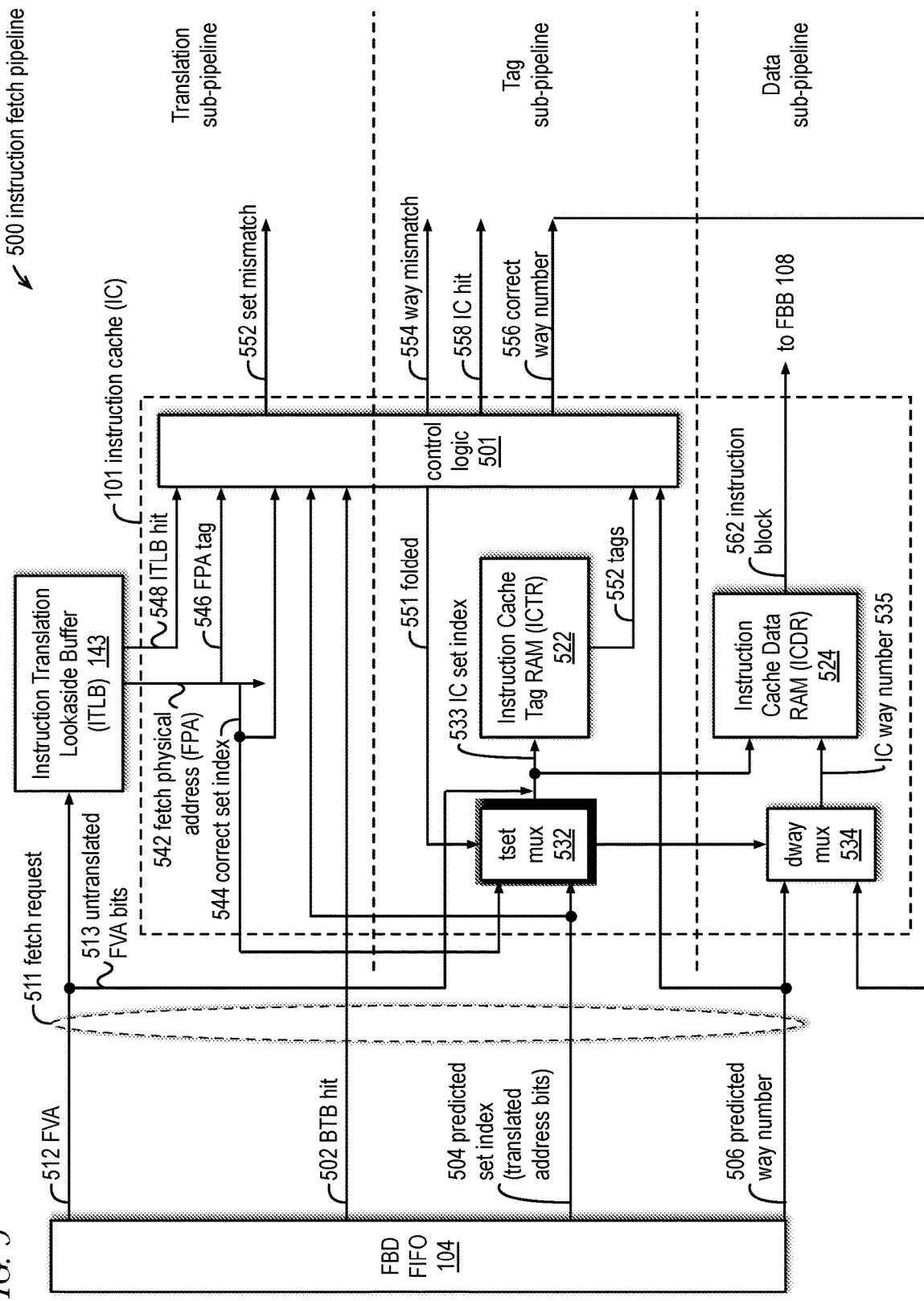
FIG. 5 is an example block diagram of an instruction fetch pipeline of the processor in accordance with embodiments of the present disclosure.

The predicted set index 204 is the value of the set index (e.g., correct set index 544 of FIG. 5) that was previously used to fetch a block of instructions from the instruction cache 101 at a fetch physical address (FPA) into which the FVA was translated (e.g., FPA 542 of FIG. 5). That is, during a first instance of a fetch request (e.g., fetch request 511 of FIG. 5) that specifies an FVA value, the instruction block is fetched from the instruction cache 101 and the correct set index 544 is written to the predicted set index 204 of the newly created BTB entry 200 to be used as a prediction of the set index during a subsequent instance of a fetch request that specifies the same FVA value. In one embodiment, to save storage space, only translated address bits of the set index are stored in the predicted set index 204 field of the BTB entry 200, whereas the untranslated address bits of the set index are provided from the FVA itself when accessing the instruction cache 101, e.g., as untranslated address bits 513 of FIG. 5.

The predicted way number 206 is the value of the way number (e.g., correct way number 556 of FIG. 5) that was previously used to fetch a block of instructions from the instruction cache 101 at a FPA into which the FVA was translated. That is, during the first instance of a fetch request that specifies the FVA value, the instruction block is fetched from the instruction cache 101 and the correct way number 556 is written to the predicted way number 206 of the newly created BTB entry 200 to be used as a prediction of the way number during a subsequent instance of a fetch request that specifies the same FVA value.

The fetch block length 208 specifies the length of a fetch block that starts at the FVA. As described above with respect to FIG. 1, the fetch block may be up to the length of a cache line of the instruction cache 101 (e.g., 64 bytes), but may be shorter if an instruction block terminating instruction, e.g., a branch instruction, appears before the end of the cache line, as described in more detail below.

The PC-relative target address 212 specifies a target address of a PC-relative branch instruction that may be calculated, e.g., by the decode unit 112, by adding the FVA and the immediate offset specified in the PC-relative branch instruction.

The termination type 214 specifies the reason for termination of the fetch block that starts at the FVA. In one embodiment, the reasons may include: the presence of a branch instruction, the presence of a "stop" type of instruction, and a sequential type that indicates a full-length fetch block (e.g., the size of a cache line of the instruction cache 101) due to the absence of a branch or stop instruction. In one embodiment, a stop instruction may include an instruction that changes privilege mode, an exception call or return from exception instruction, a breakpoint instruction, a fence instruction, and certain types of instructions that read/write a control and status register (CSR) of the processor. In one embodiment, the type of the branch instruction may be more specifically indicated, e.g., conditional branch, direct branch, indirect branch, call, return.

Figure 3:
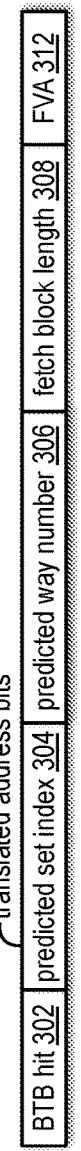
FIG. 3 is an example block diagram of a fetch block descriptor (FBD), i.e., an entry of the FBD FIFO of FIG. 1, in accordance with embodiments of the present disclosure.

FIG. 3 is an example block diagram of a fetch block descriptor (FBD) 300, i.e., an entry of the FBD FIFO 104 of FIG. 1, in accordance with embodiments of the present disclosure. The FBD 300 includes a BTB hit indicator 302, a predicted set index 304, a predicted way number 306, a fetch block length 308, and an FVA 312. As described below with respect to FIG. 4, when the PRU 102 generates an FBD, e.g., FBD 452 of FIG. 4, the FBD is written to the FBD FIFO 104 of FIG. 1 and later fetched from the FBD FIFO 104 for use by the instruction fetch pipeline 500 of FIG. 5 to fetch a block of instructions from the instruction cache 101. The BTB hit indicator 302 indicates whether the lookup of the FVA hit in the BTB 152. The predicted set index 304, predicted way number 306, and fetch block length 308 are written with the corresponding predicted set index 204, predicted way number 206, and fetch block length 208 provided by the BTB 152 in the case of a hit of the FVA in the BTB 152. The FVA 312 is the current FVA, e.g., FVA 412 of FIG. 4, used to access the BTB 152. As described herein, the predicted set index 304 and predicted way number 306 may be used to advantageously reduce the time required to fetch a block of instructions from the instruction cache 101 and facilitate operation of an instruction fetch pipeline in a folded manner.

Figure 4:
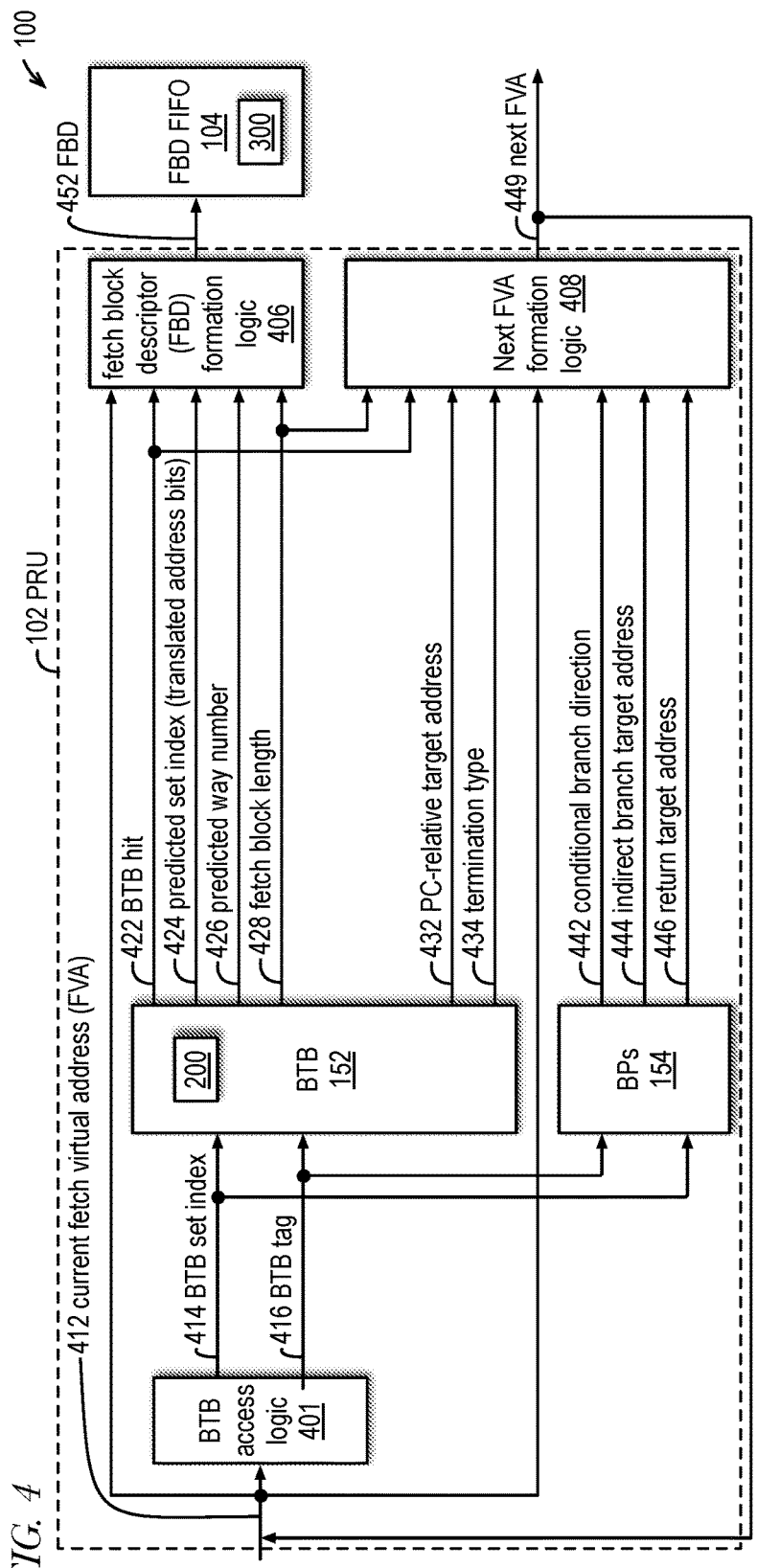
FIG. 4 is an example block diagram of the FBD FIFO and the PRU of the microprocessor core of FIG. 1, the PRU including the BTB of FIG. 1, each entry of which holds a predicted set index and predicted way, in accordance with embodiments of the present disclosure.

FIG. 4 is an example block diagram of the FBD FIFO 104 and the PRU 102 of the microprocessor core 100 of FIG. 1, the PRU 102 including the BTB 152 of FIG. 1, each entry of which holds a predicted set index and predicted way, in accordance with embodiments of the present disclosure. The PRU 102 receives a current FVA 412 and in response provides a FBD 452 and a next FVA 449. The FBD 452 is pushed into the FBD FIFO 104 and includes signals corresponding to the fields of the FBD 300 of FIG. 3. The next FVA 449 is fed back to become the current FVA 412 of a subsequent clock cycle. The PRU 102 includes the BTB 152 and branch predictors (BPs) 154 of FIG. 1, as well as BTB access logic 401, FBD formation logic 406, and next FVA formation logic 408.

In the embodiment of FIG. 4, the BTB access logic 401 receives the current FVA 412 and generates a BTB set index 414 and a BTB tag 416 that are provided to both the BTB 152 and to the BPs 154. In response to the BTB set index 414 and the BTB tag 416, the BTB 152 generates a BTB hit indicator 422 that indicates whether the BTB tag 416 matches the BTB tag 202 of a valid BTB entry 200. If so, the BTB 152 outputs the contents of the hit BTB entry 200 as a predicted set index 424, a predicted way number 426, a fetch block length 428, a PC-relative target address 432, and a termination type 434. Concurrently, in response to the BTB set index 414 and the BTB tag 416, the BPs 154 output a conditional branch direction 442, an indirect target address 444, and a return target address 446.

The FBD formation logic 406 receives the current FVA 412, the BTB hit indicator 422, the predicted set index 424, the predicted way number 426, and the fetch block length 428 and gathers them to form a FBD 452 to push into an entry 300 of the FBD FIFO 104.

The next FVA formation logic 408 receives the BTB hit indicator 422, the fetch block length 428, the PC-relative target address 432, the termination type 434, the conditional branch direction 442, the indirect target address 444, and the return target address 446 and uses them to generate the next FVA 449. If BTB hit 422 is false, the next FVA formation logic 408 predicts a maximum length sequential termination type instruction fetch block. That is, the next FVA formation logic 408 generates a value of the next FVA 449 that is the sum of the FVA 412 and the maximum fetch block length (e.g., 64 bytes). If BTB hit 422 is true, the next FVA formation logic 408 generates the next FVA 449 based on the termination type 434 and the remaining inputs. For example, if the termination type 434 indicates a PC-relative branch, then if the conditional branch direction 442 indicates "taken", the next FVA formation logic 408 outputs the PC-relative target address 432 as the next FVA 449 and otherwise outputs the sum of the FVA 412 and the fetch block length 428. If the termination type 434 indicates an indirect branch, the next FVA formation logic 408 outputs the indirect branch target address 444 as the next FVA 449. If the termination type 434 indicates a return instruction, the next FVA formation logic 408 outputs the return target address 446 as the next FVA 449. If the termination type 434 indicates a stop type instruction, the next FVA formation logic 408 outputs the sum of the FVA 412 and the fetch block length 428 as the next FVA 449.

In one embodiment, the BTB access logic 401 generates the BTB set index 414 as a hash of a subset of bits of the PM 199, the VMID 197, and the current FVA 412, and generates the BTB tag 416 as a hash of a different subset of bits of the PM 199, the VMID 197, and the current FVA 412. However, other embodiments are contemplated, e.g., in which the BTB access logic 401 outputs lower bits of the current FVA 412 as the BTB set index 414 and outputs upper bits of the current FVA 412 as the BTB tag 416.

FIG. 5 is an example block diagram of an instruction fetch pipeline 500 of the processor 100 in accordance with embodiments of the present disclosure. The instruction fetch pipeline 500 includes the FBD FIFO 104, ITLB 143, and instruction cache 101 of FIG. 1. The instruction cache 101 includes an instruction cache tag RAM (ICTR) 522, an instruction cache data RAM (ICDR) 524, a tset mux 532, a dway mux 534, and control logic 501. The FBD FIFO 104 outputs the FBD 300 at its head to provide an FVA 512, BTB hit indicator 502, predicted set index 504, and predicted way number 506, which are referred to collectively as a fetch request 511. The instruction cache 101 is a set-associative cache. In one embodiment, the instruction cache 101 is configured as having four ways, and the predicted way number 206 is two bits, although other embodiments are contemplated in which the instruction cache 101 is configured with other numbers of ways.

The ITLB 143 translates the FVA 512 into a fetch physical address (FPA) 542, assuming the FVA 512 hits in the ITLB 143. An ITLB hit indicator 548 indicates whether the FVA 512 hit in the ITLB 143 and is provided to the control logic 501. The FPA 542 includes a correct set index 544 portion and a FPA tag 546 portion, each of which is provided to the control logic 501. The control logic 501 also receives the predicted set index 504. In one embodiment, the ITLB 143 is a single-ported RAM structure. The correct set index 544, like the predicted set index 504, includes only translated address bits. The control logic 501 compares the correct set index 544 and the predicted set index 504 and generates a true value on a set mismatch indicator 552 if they do not match and otherwise generates a false value. The ITLB 143 and the portion of the control logic 501 that generates the set mismatch indicator 552 are shown in FIG. 5 as a translation sub-pipeline portion of the instruction fetch pipeline 500.

The control logic 501 generates a folded 551 control signal that controls the tset mux 532 and the dway mux 534. The folded 551 signal determines whether the instruction fetch pipeline 500 operates in a folded mode or in an unfolded mode. Generally, the control logic 501 generates a true value on the folded 551 signal if BTB hit 502 is true and otherwise generates a false value, although other circumstances are described below in which the control logic 501 may generate a true value on the folded 551 signal.

The tset mux 532 receives the correct set index 544 and the predicted set index 504 and selects the predicted set index 504 if the folded 551 signal is true and selects the correct set index 544 otherwise. The output of the tset mux 532 is combined with untranslated FVA bits 513 to form an IC set index 533 used to select a set of tags 522 of the ICTR 522 that are provided to the control logic 501. In one embodiment, the ICTR 522 is a single-ported RAM structure. The control logic 501 compares each of the tags 522 with the FPA tag 546 and generates a true value on an IC hit indicator 558 if a valid match is found and otherwise generates a false value. If the IC hit indicator 558 is true, the control logic 501 also generates a correct way number 556 that indicates the way of the instruction cache 101 that was hit. Additionally, the control logic 501 compares the correct way number 556 with the predicted way number 506 and generates a true value on a way mismatch indicator 554 if they do not match and otherwise generates a false value. The ICTR 522, tset mux 532 and the portion of the control logic 501 that generates the way mismatch indicator 554, the correct way number 556, and the IC hit indicator 558 are shown in FIG. 5 as a tag sub-pipeline portion of the instruction fetch pipeline 500.

The dway mux 534 receives the correct way number 556 and the predicted way number 506 and outputs selects the predicted way number 506 if the folded 551 signal is true and selects the correct way number 556 otherwise. The selected input is provided as an IC way number 535 that is used, along with the IC set index 533, to select an entry of the ICDR 524 that provides a cache line of data that is a fetched block of instructions 562 that is provided to the FBB 108 of FIG. 1. More specifically, even though the ICDR 524 is arranged in a set-associative fashion (i.e., having multiple ways), only a single way (i.e., only a single cache entry) of the selected set is read out. Advantageously, by reading out only a single way of the ICDR 524, significant power savings may be enjoyed over a conventional design that reads out all N ways, i.e., the cache lines of all the N entries, of a selected set of a data structure and then selects one of the cache lines after the correct way number has been determined from the lookup in the tag structure. As described herein, the power saving advantage just described is also enjoyed along with the low latency advantage of a folded pipeline since the described embodiments do not have to wait for the correct way number to be determined but instead immediately access the ICDR 524 using the predicted way number 506 predicted by the BTB 152. Although not shown, the fetch block length 308 is also output by the FBD FIFO 104 as part of the fetch request 511 and may be used to qualify the number of bytes of the fetched instruction block 562 that are written to the FBB 108. Additionally, in one embodiment the ICDR 524 comprises multiple adjacent RAM macros, e.g., each of four RAM macros is 16 bytes wide to provide a 64-byte instruction block 562, and the fetch block length 308 may be used to save additional power by reading out from only the necessary one or more RAM macros. For example, assume the offset into the cache line indicated by the untranslated lower bits of the FVA 512 are at byte 3 and the fetch block length 208 is 11 bytes, then only a single RAM macro (i.e., the first RAM macro) is read out and the other three RAM macros are not read out, which may save power relative to an embodiment that reads out all four of the RAM macros without regard for the fetch block length 208. In one embodiment, the ICDR 524 is a single-ported RAM structure. The ICDR 524 and the dway mux 534 are shown in FIG. 5 as a data sub-pipeline portion of the instruction fetch pipeline 500.

As described herein, when the BTB hit indicator 502 indicates that the BTB 152 has provided a predicted set index and a predicted way number, the instruction fetch pipeline 500 may operate in a folded pipeline mode such that the translation sub-pipeline, the tag sub-pipeline, and the data sub-pipeline operate in parallel to significantly reduce the latency of the instruction fetch pipeline 500. More specifically, in the data sub-pipeline the instruction block 562 is advantageously immediately fetched from the ICDR 524 using the predicted set index 504 and the predicted way number 506, while in parallel in the translation sub-pipeline the ITLB 143 translates the FVA 512 into the FPA 542 and the control logic 501 generates the set mismatch 552 signal, and in parallel in the tag sub-pipeline the ICTR 522 determines the correct way number 556 and generates the way mismatch 554 signal. However, in other circumstances, e.g., a miss in the BTB 152, the instruction fetch pipeline 500 may briefly operate in an unfolded pipeline mode as needed such that the translation sub-pipeline, the tag sub-pipeline, and the data sub-pipeline operate sequentially. The instruction fetch pipeline 500 may also include staging registers (not shown) that stage various signals as needed. For example, when operating in unfolded mode, the correct set index 544 may be staged down from the translation sub-pipeline to the tag sub-pipeline, and the IC set index 533 may be staged down from the tag sub-pipeline to the data sub-pipeline.

Figure 6:
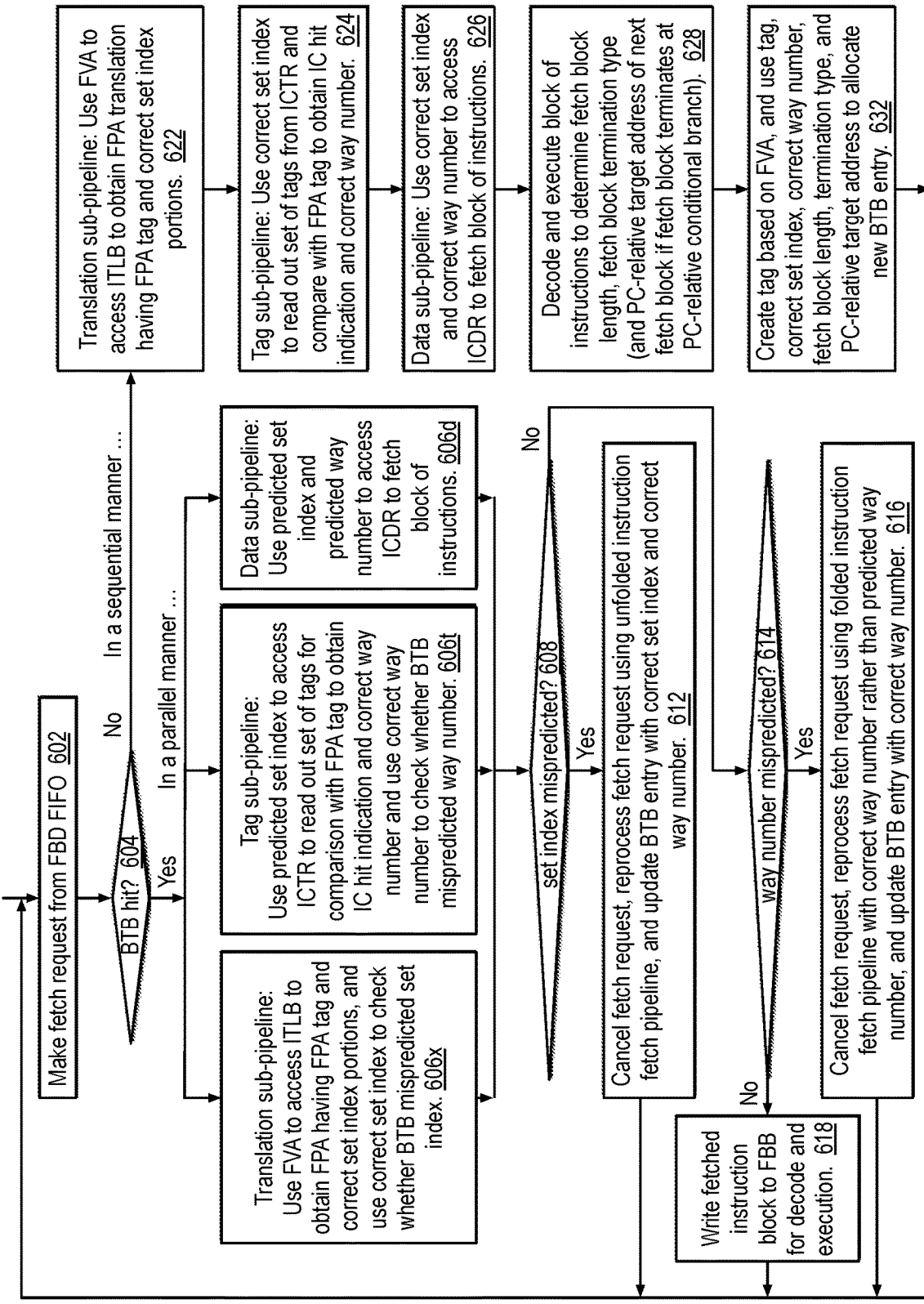
FIG. 6 is an example flowchart illustrating operation of the PRU of FIG. 4 and the instruction fetch pipeline of FIG. 5 in accordance with embodiments of the present disclosure.

FIG. 6 is an example flowchart illustrating operation of the PRU 102 of FIG. 4 and the instruction fetch pipeline 500 of FIG. 5 in accordance with embodiments of the present disclosure. Operation begins at block 602.

At block 602, a fetch request 511 of FIG. 5 is made from the FBD FIFO 104. Operation proceeds to decision block 604.

At decision block 604, if the BTB hit indicator 502 is true, operation proceeds to blocks 606x, 606t, and 606d, which are performed in a parallel manner, e.g., the control logic 501 generates a true value on the folded signal 551; otherwise, operation proceeds to block 622, and blocks 622, 624, and 626 are performed in a sequential manner, e.g., the control logic 501 generates a false value on the folded signal 551.

At block 606x, in the translation sub-pipeline, the FVA 512 is used to access the ITLB 143 to obtain the translation of the FVA 512, i.e., FPA 542, which includes the FPA tag 546 and the correct set index 544. In one embodiment, the IC set index 533 is a hash of lower bits of the FPA 542 (e.g., FPA[16:7]) with higher bits of the FPA 542. Additionally, the correct set index 544 is used by the control logic 501 to check whether the BTB 152 mispredicted the set index, i.e., whether the predicted set index 504 does not match the correct set index 544. Operation proceeds from block 606x to decision block 608.

At block 606t, in the tag sub-pipeline, the predicted set index 504 is used to access the ICTR 522 to read out a set of tags 552 for comparison with the FPA tag 546 to obtain the IC hit indicator 558 and correct way number 556. Additionally, the correct way number 556 is used by the control logic 501 to check whether the BTB 152 mispredicted the way number, i.e., whether the predicted way number 506 does not match the correct way number 556. Operation proceeds from block 606t to decision block 608.

At block 606d, in the data sub-pipeline, the predicted set index 504 and the predicted way number 506 are used to access the ICDR 524 to fetch an instruction block 562. Operation proceeds from block 606d to decision block 608.

At decision block 608, if the set mismatch 552 indicator is true, operation proceeds to block 612; otherwise, operation proceeds to decision block 614.

At block 612, because the set index was mispredicted by the BTB 152, the current fetch request 511 is canceled, i.e., none of the bytes of the fetched instruction block 562 are written into the FBB 108. Furthermore, the instruction fetch pipeline 500 reprocesses the fetch request 511 in the unfolded mode, i.e., in a sequential manner, similar to the manner described with respect to blocks 622, 624 and 626. In an alternate embodiment, the instruction fetch pipeline 500 reprocesses the fetch request 511 in a partially folded manner. That is, the control logic 501 controls the tag sub-pipeline to use the correct set index 544 obtained from the first/canceled processing instance of the fetch request 511 to, during the second processing instance of the fetch request 511, initiate access of the ICTR 522 in parallel with the initiation of the lookup of the FVA 512 in the ITLB 143, and the control logic 501 controls the data sub-pipeline to, in a sequential manner, wait and use the correct set index 544 obtained from the translation sub-pipeline and the correct way number 556 obtained from the tag sub-pipeline to access the ICDR 524 to fetch the instruction block 562. In both embodiments, because the BTB 152 mispredicted the set index in the first/canceled processing instance, the instruction fetch pipeline 500 was not able to determine the correct way number during the first/canceled processing instance, so it is assumed that the BTB 152 also mispredicted the way number. Finally, after the second processing instance, the BTB entry 200 that mispredicted is updated with the correct set index 544 and correct way number 556. Operation returns to block 602 to process the next fetch request 511.

At decision block 614, if the way mismatch 554 indicator is true, operation proceeds to block 616; otherwise, operation proceeds to block 618.

At block 616, because the way number was mispredicted by the BTB 152, the current fetch request 511 is canceled. Furthermore, the instruction fetch pipeline 500 reprocesses the fetch request 511 in the folded mode, i.e., in a parallel manner, similar to the manner described with respect to blocks 606x, 606t and 606d but using the correct set index 544 and correct way number 556 obtained during the first/canceled processing instance of the fetch request 511. Finally, after the second processing instance, the BTB entry 200 that mispredicted is updated with the correct way number 556. Operation returns to block 602 to process the next fetch request 511.

At block 618, because the set index and way number were correctly predicted by the BTB 152, the fetched instruction block 562 is written to the FBB 108 for subsequent decode by the decode unit 112 and execution by the execution units 114. Operation returns to block 602 to process the next fetch request 511.

At block 622, in the translation sub-pipeline, the FVA 512 is used to access the ITLB 143 to obtain the translation of the FVA 512, i.e., FPA 542, which includes the FPA tag 546 and the correct set index 544. Additionally, the correct set index 544 is used by the control logic 501 to check whether the BTB 152 mispredicted the set index. Operation proceeds to block 624.

At block 624, in the tag sub-pipeline, the correct set index 544 provided by the translation sub-pipeline at block 622 is used to access the ICTR 522 to read out a set of tags 552 for comparison with the FPA tag 546 to obtain the IC hit indicator 558 and correct way number 556. Additionally, the correct way number 556 is used by the control logic 501 to check whether the BTB 152 mispredicted the way number. Operation proceeds to block 626.

At block 626, in the data sub-pipeline, the correct set index 544 provided by the translation sub-pipeline at block 622 and the correct way number 556 provided by the tag sub-pipeline at block 624 are used to access the ICDR 524 to fetch an instruction block 562 that is written to the FBB 108. That is, blocks 622, 624, and 626 are performed in a sequential manner according to an unfolded mode of the instruction fetch pipeline 500. Operation proceeds to block 628.

At block 628, the instruction block 562 written to the FBB 108 at block 626 is subsequently fetched from the FBB 108 and decoded by the decode unit 112, and the decoded instructions are dispatched to the execution units 114 for execution. During the decode and execution of the instructions, the fetch block length, the termination type, and the PC-relative target address of the next fetch block (in the case the fetch block terminates in a PC-relative conditional branch instruction) may be determined. Operation proceeds to block 632.

At block 632, a BTB tag is generated based on the FVA 512, e.g., a hash as described above with respect to FIG. 2. The generated BTB tag, the correct set index 544 determined at block 622, the correct way number 556 determined at block 624, and the fetch block length, the termination type, and the PC-relative target address determined at block 628, are used to create and allocate a new BTB entry 200 into the BTB 152. Operation returns to block 602 to process the next fetch request 511.

As described above, advantageously the instruction fetch pipeline may be shortened/folded while also obtaining the power saving benefit of reading out only a single way of the instruction cache data RAM per instruction block fetch. The power savings may be particularly significant in embodiments in which the amount of bytes per data RAM entry is large, e.g., 64 bytes per entry as in one embodiment and 128 bytes per entry as in another embodiment. Further advantageously, the described embodiments may enable the processor 100 to have a single first-level instruction cache 101 that is large relative to a conventional design that has multiple levels of instruction cache and in which the first-level instruction cache is relatively small in order to facilitate single-clock cycle accesses since the conventional instruction fetch pipeline does not operate in a folded manner. In one embodiment, the instruction cache 101 is arranged as 2048 sets and 4 ways for a total of 8192 entries each holding a 64-byte cache line of instructions, and the ICDR 524 is a 512 KB RAM having a latency of two clock cycles when operating in folded mode, whereas in contrast a first-level instruction cache of a conventional multi-level instruction cache hierarchy design in a similar semiconductor technology may be a 32 KB or 64 KB cache, which may result in a lower hit rate than the larger first-level instruction cache 101 of the described embodiments. Further advantageously, the described embodiments may enable the processor 100 to have an ITLB 143 that is large relative to a conventional design in which the instruction TLB is/are relatively small in order to facilitate single-clock cycle accesses since the conventional instruction fetch pipeline does not operate in a folded manner. In one embodiment, the ITLB 143 comprises three TLBs that respectively support three different page sizes (e.g., 4 KB, 2 MB, and 1 GB pages) and collectively comprise more than three thousand entries and which have a two clock cycle access latency.

Figure 7:
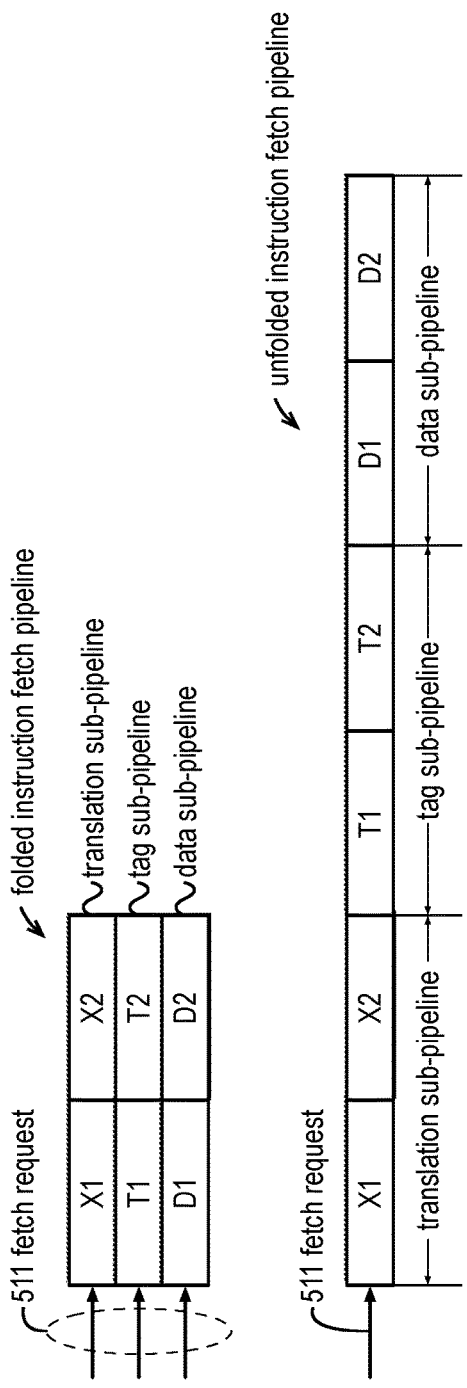
FIG. 7 is two example pipeline diagrams illustrating dynamic operation of the instruction fetch pipeline of FIG. 5 in both a folded mode and in an unfolded mode in accordance with embodiments of the present disclosure.

FIG. 7 is two example pipeline diagrams illustrating dynamic operation of the instruction fetch pipeline 500 of FIG. 5 in both a folded mode and in an unfolded mode in accordance with embodiments of the present disclosure. In the example embodiment of FIG. 7, each of the translation, tag, and data sub-pipelines comprises two pipeline stages. The two translation sub-pipeline stages are designated X1 and X2; the two tag sub-pipeline stages are designated T1 and T2; and the two data sub-pipeline stages are designated D1 and D2.

The folded mode of operation is shown in the top pipeline diagram of FIG. 7 in which each of the three sub-pipelines operate in parallel. More specifically, the X1, T1 and D1 stages each process a portion of the fetch request 511 during a first clock cycle, and the X2, T2 and D2 stages each process a portion of the fetch request 511 during a next clock cycle. In this manner, the effective latency of the instruction fetch pipeline 500 incurred by the three sub-pipelines during folded mode operation is only two clock cycles, in contrast to the six clock cycles incurred by the three sub-pipelines in the unfolded mode, as will now be described.

The unfolded mode of operation is shown in the bottom pipeline diagram of FIG. 7 in which each of the three sub-pipelines operate sequentially. More specifically, the X1 stage processes the fetch request 511 during a first clock cycle, then the X2 stage processes the fetch request 511 during a second clock cycle, then the T1 stage processes the fetch request 511 during a third clock cycle, then the T2 stage processes the fetch request 511 during a fourth clock cycle, then the D1 stage processes the fetch request 511 during a fifth clock cycle, then the D2 stage processes the fetch request 511 during a sixth clock cycle. In this manner, the effective latency of the instruction fetch pipeline 500 during unfolded mode operation incurred by the three sub-pipelines is six clock cycles.

In one embodiment, as described above, the ITLB 143, the ICTR 522, and the ICDR 524 are all singe-ported RAM structures. As described herein, the instruction fetch pipeline 500 may dynamically switch back and forth between the folded and unfolded modes, an embodiment of which is described below with respect to FIG. 8. For example, the instruction fetch pipeline 500 may switch to unfolded mode if the fetch request 511 indicates a miss in the BTB 152, e.g., via BTB hit indicator 502, or there is a miss in the ITLB 143 or instruction cache 101, as described below with respect to FIG. 8. In one embodiment, the switch back to the folded pipeline operation occurs right after processing of the current fetch request that requires unfolded pipeline operation. That is, the pipeline unfolds only for one fetch request and then refolds unless the next fetch request requires processing via an unfolded pipeline, e.g., BTB miss. In this manner, sub-pipeline conflicts, e.g., between the data sub-pipeline stages of the unfolded pipeline and the data sub-pipeline stages of the folded pipeline, are avoided. As a result, the start of processing of the next fetch request is delayed until the current fetch request is in the D1 sub-pipeline stage. Thus, in the embodiment of FIG. 7, there is a four-cycle delay for switching from an unfolded pipeline back to a folded pipeline if the next fetch request is immediately ready behind the current fetch request, whereas the delay is reduced if there is a gap between current and next fetch requests. In an alternate embodiment, the pipeline refolds for the next fetch request independent of the BTB hit indicator 502 (although as described above, depending upon when the next fetch request is ready behind the current fetch request, a delay may be incurred for switching from an unfolded pipeline back to a folded pipeline in order to avoid sub-pipeline conflicts). In yet another embodiment, the pipeline may remain unfolded and continue to operate in an unfolded manner for subsequent fetch requests until one or more events occur, e.g., the FBD FIFO 104 is empty, a branch misprediction is detected that causes the front-end 110 to be flushed, etc. In such an embodiment, the pipeline may continue to operate in a fully pipelined manner as long as the FBD FIFO 104 is not empty.

Figure 8:
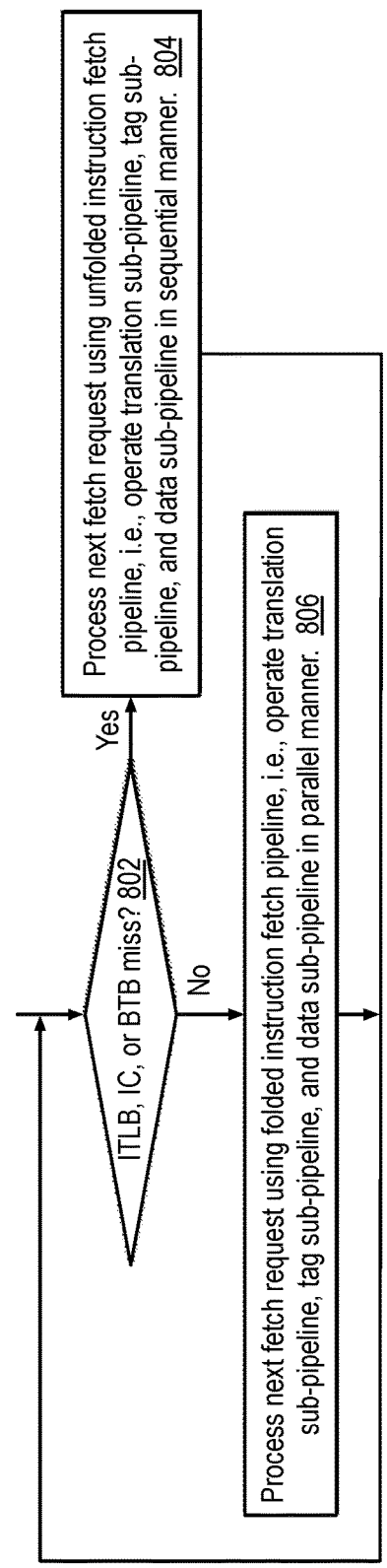
FIG. 8 is an example is an example flowchart illustrating operation of the instruction fetch pipeline of FIG. 5 in accordance with embodiments of the present disclosure.

FIG. 8 is an example flowchart illustrating operation of the instruction fetch pipeline 500 of FIG. 5 in accordance with embodiments of the present disclosure. Operation begins at decision block 802.

At block 802, if there is a miss in the ITLB 143, instruction cache 101, or BTB 152 (e.g., as determined at decision block 604 of FIG. 6), operation proceeds to block 804; otherwise, operation proceeds to block 806.

At block 804, the instruction fetch pipeline 500 processes the next fetch request 511 in an unfolded manner, i.e., the translation, tag, and data sub-pipelines operation in a sequential manner, e.g., as described above with respect to block 622, 624, and 626 of FIG. 6. Operation returns to decision block 802 to process the next fetch request 511.

At block 806, the instruction fetch pipeline 500 processes the next fetch request 511 in an folded manner, i.e., the translation, tag, and data sub-pipelines operation in a parallel manner, e.g., as described above with respect to block 606x, 606t, and 606d of FIG. 6. Operation returns to decision block 802 to process the next fetch request 511.

Prediction Unit (PRU) with Single Cycle Predictor (SCP)

As described above, a goal of the front-end 110 is to avoid starvation of the DEC 112. Stated alternatively, a goal of the front-end 110 is to keep the mid-end 120 as fully supplied as possible with instructions to decode and dispatch to the back-end 130 in order to keep the back-end 130 as fully supplied as possible—given instruction-level parallelization limitations the program may impose—with instructions to execute in order to optimize performance of the processor 100. Because the back-end 130 may execute instructions out-of-order and in a superscalar fashion, the back-end 130 may require a significant number of instructions per clock cycle to be highly utilized and achieve high performance. For example, in some embodiments the DEC 112 may be capable of decoding and dispatching four or more instructions per clock, and the back-end 130 may be capable of executing four or more instructions per clock. Although the FBD FIFO 104 and FBB 108 may dampen the effect of instruction stream peaks and troughs for a relatively short number of clock cycles, for workloads in which the mid-end 120 and the back-end 130 can sustain a high instruction per clock rate for a significant number of clock cycles, the front-end 110 will also need to sustain the high instruction per clock rate.

As also described above, in one embodiment a cache line fetched from the instruction cache 101 may be up to 64 bytes, for example. For an embodiment in which the size of an instruction is four bytes, for example, up to sixteen instructions may be fetched in a clock cycle. However, as also described above, groups of instructions are written to the FBB 108 at the granularity of a FBlk. As also described above, a FBlk may be anywhere from one instruction to the maximum number of instructions in a cache line, depending upon where in the FBlk the terminating instruction, if any, appears in the FBlk. Assume for example that, for a given lengthy instruction stream, the typical number of instructions per FBlk is four and the typical number of instructions the mid-end 120 can dispatch per clock and the back-end 130 can execute per clock is four. In such an example, the front-end 110 is likely to be able to provide the needed instruction rate to the mid/back-ends 120/130 if the PRU 102 provides FBDs 452 to the instruction fetch pipeline 500 (via the FBD FIFO 104) at a rate of one FBD per clock so that the instruction fetch pipeline 500 can fetch from the instruction cache 101 at a rate of one FBlk per clock. However, if the PRU 102 provides FBDs at a rate of less than one per clock, the instruction cache 101 will not be able to fetch at a rate of one FBlk per clock, and the back-end 130 may experience starvation.

Given the demands of high-performance processors for a short clock cycle and high fetch prediction accuracy, it may be difficult to design a PRU 102 that is configured to produce at a rate of one FBD per clock and achieve a high clock rate. More specifically, as may be illustrated by the example embodiment of FIG. 4, the PRU 102 uses the fetch address (e.g., current FVA 412) of the current FBlk (first FBlk) to produce a FBD 452 for the current FBlk and to produce a fetch address (e.g., next FVA 449) of the next FBlk (second FBlk) which is fed back for use by the PRU 102 to produce a FBD 452 for the second FBlk and a fetch address for a third FBlk, and so forth. Thus, a fetch address loop around the PRU 102 exists in which FBDs are produced at the rate that next fetch addresses are produced by the PRU 102. In order to produce at the desired rate of one FBD per clock as discussed above, the PRU 102 must produce at a rate of one next fetch address per clock.

One solution is to design a PRU 102 that takes no more than a single clock cycle to generate the next FVA 449 using the current FVA 412 and feed the next FVA 449 back around the loop as the current FVA 412 for use in generating the next FVA 449 for the next FBlk. However, this may be difficult to achieve given the desired short clock cycles of high-performance microprocessors and the complex and/or large predictors (BTB 152 and BPs 154) required to achieve high fetch prediction accuracy and that may require large lookup times as well as the time required by the next FVA formation logic 408 to take in the predictor outputs and form the next FVA 449 (as well as muxing, not shown, to select the current FVA 412 from among the next FVA 499 and other fetch addresses, e.g., correction fetch address for misprediction correction) as well as hashing logic 401 to generate the index and tag used to access the BTB 152, for example. Given the fetch address loop, if the PRU 102 takes N clock cycles to receive the current FVA 412 and feed the next FVA 449 back, then a rate of 1/N FBD's per clock may be produced, which for some instruction streams may result in starvation of the back-end 130.

Advantageously, embodiments are described in which the fetch address loop is effectively broken into two pieces by the employment of a single-cycle predictor (SCP) at the front end of the PRU 102 that effectively replaces the BTB access logic 401 of FIG. 4 and checking logic at the end of the PRU 102 that checks the SCP prediction against a more accurate prediction, generally speaking, made by the other predictors (e.g., the BTB 152 and the branch predictors (BPs) 154) that trains the SCP if necessary. The SCP is a simple predictor, relative to the other predictors, that is incapable of providing a FBD 452 (e.g., incapable of providing a full fetch address), but is capable of outputting the information needed by the other predictors to enable them to initiate their lookups. And, the SCP is fast enough to receive its input, output the needed information selected by the input, and feedback the output through a mux to its input in a single clock cycle. That is, the SCP uses information associated with a previous FBlk to predict a small amount of information, relative to the other predictors, associated with a current FBlk each clock cycle that is used by the other predictors to initiate their lookups in order to make a full prediction associated with a next FBlk that is hopefully more accurate, and in some embodiments made over multiple clock cycles. That is, the input used to access the SCP in a given clock cycle is at least a portion of the output of the SCP associated with the previous FBlk (i.e., the FBlk immediately preceding the current FBlk in program execution order) from the previous clock cycle that is fed back around to form a single-clock cycle loop around the SCP.

Viewed from another perspective, the multi-clock cycle fetch address loop around the PRU 102 of FIG. 4 is replaced with the single-cycle SCP loop followed by a fetch block prediction unit (FBPU), e.g., the BTB 152, the BPs 154, the next FVA formation logic 408, and the fetch block descriptor formation logic 406. That is, the FBPU is preceded by the single-cycle loop around the SCP that, every clock cycle, provides another output of information to the FBPU that the uses to produce FBDs 452 and next FVAs 449 at the rate of one per clock cycle, as described below in more detail. More specifically, each clock cycle, the FBPU produces a FBD 452 that describes the current FBlk and a prediction of the next fetch address, branch direction, and indirect branch indicator produced by the current FBlk. In one embodiment, the FBPU is a fully pipelined multi-cycle prediction unit.

The small amount of information output by the SCP that is needed by the other predictors to initiate their lookups may include a hashed index (e.g., 13 bits), a hashed tag (e.g., 9 bits), a branch direction (1 bit), and an indirect branch indicator (1 bit). The SCP output is a prediction of information that will be produced by a previous FBlk when subsequently fetched from the instruction cache and decoded executed. The hashed index and hashed tag comprise respective first and second hashes of a prediction of a next fetch address produced by the previous FBlk. A different combination of bits of the next fetch address is hashed to generate the hashed index than the combination of bits of the next fetch address hashed to generate the hashed tag. The hashed index and hashed tag may also be hashed with a virtual machine identifier and may also be hashed with a privilege level. The hashed index may be used to initiate lookups in random access memories (RAMs) of the predictor structures of the FBPU, and the hashed tag may be used to perform comparisons with tags of some of the FBPU predictor structures. The branch direction indicator predicts whether the previous FBlk is terminated by a Taken branch instruction. The indirect branch indicator predicts whether the previous FBlk is terminated by an indirect branch instruction. The branch direction and indirect branch indicator, along with one or more bits of the hashed index, are used to create an updated branch history based on a current branch history. The hashed index and hashed tag provided by the SCP may be hashed with the various lengths of the updated branch history to generated indexes and tags used to access some of the FBPU predictor structures.

As described above, a portion of the SCP output associated with a previous FBlk of the previous clock cycle is fed back and used as the input to the SCP on the current clock cycle to obtain information associated with the current FBlk. In one embodiment, a portion of the hashed index that is output by the SCP is fed back as the input to the SCP. Hence, when training the SCP, the fetch address of the previous FBlk is hashed and the hash result (i.e., the portion corresponding to the SCP input) is used to select the entry of the SCP to be trained. The trained SCP entry is written with a first hash of the next fetch address produced by the previous FBlk (hashed index), a second hash of the next fetch address produced by the previous FBlk (hashed tag), the direction bit produced by the previous FBlk, and the indirect branch indicator produced by the previous FBlk.

The training of an SCP entry may be performed in response to detection of a mis-prediction. For example, after the FBPU makes its prediction using the SCP prediction (i.e., the SCP output), the SCP and FBPU predictions may be compared, and if the predictions mismatch, then the mis-predicting SCP entry may be trained using the FBPU prediction. For another example, after the instruction fetch unit fetches a FBlk predicted by the FBPU and the DEC 112 and execution units 114 decode and execute the FBlk, the prediction made by the FBPU may be compared with the execution results, and if they mismatch, then the FBPU, as well as the SCP, may be trained using the execution results.

Advantageously, the SCP, by breaking the fetch address loop and providing a new output each cycle that is usable by the FBPU to initiate its lookups each cycle, facilitates a higher clock rate and/or larger predictors—e.g., branch target buffer, conditional branch predictor, indirect branch predictor, return address predictor—that may take a long time (multiple clock cycles in some embodiments) to make very accurate branch predictions relative to smaller single-cycle branch predictors. For example, in one embodiment the BTB 152 has 12K entries (2K sets of 6 ways each), the CBP 1142 of FIG. 11 has 16K entries (one 8K-entry bimodal table and four 2K-entry tagged tables), and the IBP 1144 of FIG. 11 has 2K entries (four 512-entry tagged tables).

FIG. 9 is an example block diagram of a SCP entry 900 in accordance with embodiments of the present disclosure. SCP entries 900 are held in the SCP 1001 of FIGS. 10A and 10B that provides an SCP entry 900 each clock cycle to the FBPU 1102 of FIG. 11, as described in more detail below. Each SCP entry 900 is associated with a FBlk, and each FBlk has an associated fetch address. Each SCP entry 900 is populated using training information generated either based on execution of the FBlk (e.g., by the DEC 112 and/or the execution units 114) or based on a prediction of the FBlk by the FBPU 1102 that takes more clock cycles and tends to be more accurate in its predictions than the SCP 1001, depending upon the workload of the program being executed. In one embodiment, the prediction accuracy of the SCP 1001 for some workloads tends to be approximately seventy percent or better, whereas the prediction accuracy of the FBPU 1102 for the workloads tends to be approximately ninety five percent or better, although the accuracy percentages may vary with workload. Thus, the SCP entry 900 may be viewed as a primitive prediction that enables the FBPU 1102 to begin its process of making a full and more accurate prediction each clock cycle. Even though the FBPU 1102, unlike the SCP 1001, may (or may not) require multiple clock cycles to provide its prediction, the FBPU 1102 is able to make a prediction each clock cycle because the SCP 1001 breaks the fetch address loop (and is fully pipelined in embodiments in which it has multiple stages), as described above, and provides each clock cycle the information the FBPU 1102 needs to initiate its lookups. The SCP entry 900 includes a hashed next fetch address index (HNFAI) 902, a hashed next fetch address tag (HNFAT) 904, a branch direction SCP (BrDir-S) indicator 906, an indirect branch SCP (IndBr-S) indicator 908, and a useful indicator 912. The BrDir-S indicator 906 and the IndBr-S indicator 908, along with one or more bits of the HNFAI 902, are collectively referred to as branch history update information (BHUI) 919.

The HNFAI 902 is a value that is the result of a hash of a fetch address of a current FBlk, which is a prediction of the hash of the next fetch address to be produced by the previous FBlk, i.e., the FBlk that immediately precedes in program execution order the current FBlk with which the SCP entry 900 is associated. Thus, the HNFAI 902 functions as a proxy for the fetch address of the current FBlk. The previous FBlk is the FBlk whose hashed fetch address is used to select the entry 900. The current FBlk is the FBlk for which the FBPU 1102 will make a prediction using the entry 900. In one embodiment, the hash comprises a Boolean exclusive-OR (XOR) of different sets of bits of the fetch address. For example, in one embodiment the HNFAI 902 is 13 bits wide, and different sets of 13 bits of the fetch address are hashed with one another to generate the 13-bit HNFAI 902. In another embodiment, bits of the VMID 197 are also hashed along with the fetch address to generate the HNFAI 902. In another embodiment, the privilege mode 199 is also hashed along with the fetch address and the VMID 197 to generate the HNFAI 902. The HNFAI 902 is used to index into the BTB 152 and therefore may also be referred to as a "BTB set index." This is one sense in which the HNFAI 902 functions as a proxy for the fetch address of a FBlk. The HNFAI 902 is subsequently hashed with one or more branch histories (e.g., global branch history (GHist), conditional path history (CPHist), indirect path history (IPHist)) to generate indexes (1131, 1133 of FIG. 11) used to index some of the branch predictors 154, e.g., CBP 1142, IBP 1144, as described below with respect to FIG. 11. This is another sense in which the HNFAI 902 functions as a proxy for the fetch address of a FBlk. Advantageously, by providing the HNFAI 902 each clock cycle, the SCP 1001 enables initiation of lookups in the BTB 152 and the branch predictors 154 each clock cycle, as described in more detail below. One or more bits of the HNFAI 902 are combined with the current CPHist to provide an updated CPHist that is subsequently hashed with the HNFAI 902 and HNFAT 904 used to access the CBP 1142 and IBP 1144, as described below. Additionally, the one or more bits of the HNFAI 902 are shifted into the current CPHist, as described below.

The HNFAT 904, similar to the HNFAI 902, is a value that is the result of a hash of the fetch address of the current FBlk. However, the sets of bits of the fetch address used in the hash to generate the HNFAT 904 are at least partially different than the sets of bits of the fetch address that are used in the hash to generate the HNFAI 902. For example, in one embodiment the HNFAT 904 is 9 bits wide, and different sets of 9 bits of the fetch address are hashed with one another to generate the 9-bit HNFAT 904. In another embodiment, bits of the VMID 197 are also hashed along with the fetch address to generate the HNFAT 904. In another embodiment, the privilege mode 199 is also hashed along with the fetch address and the VMID 197 to generate the HNFAT 904. The HNFAT 904 is used in tag comparisons with the BTB 152 to select a BTB entry 200. The HNFAT 904 is subsequently hashed with the one or more branch histories to generate tags (1132, 1134 of FIG. 11) used in tag comparisons with tags of the CBP 1142 and IBP 1144, as described below with respect to FIG. 11.

The BrDir-S indicator 906 indicates a prediction of the branch direction, i.e., Taken or Not Taken, to be produced by execution of the previous FBlk. In one embodiment, if the previous FBlk is a sequential FBlk (e.g., included no branch instructions), the BrDir-S indicator 906 value indicates a Not Taken branch direction. The BrDir-S indicator 906 prediction is combined with the current GHist to provide an updated GHist that is subsequently hashed with the HNFAI 902 and HNFAT 904 used to access the CBP 1142 and IBP 1144, as described below. Additionally, the BrDir-S 906 is shifted into the current GHist, as described below.

The IndBr-S indicator 908 indicates whether the previous FBlk is terminated by an indirect branch instruction. The IndBr-S indicator 908 is used to selectively generate an updated IPHist. More specifically, if the IndBr-S indicator 908 indicates the previous FBlk is terminated by an indirect branch instruction, one or more bits of the HNFAI 902 are combined with the current IPHist to provide the updated IPHist that is subsequently hashed with the HNFAI 902 and HNFAT 904 used to access the CBP 1142 and IBP 1144, as described below.

The useful bit 912 is a replacement control bit that provides hysteresis to avoid needless training of the SCP entry 900, e.g., in a program execution pattern in which the FBlk is continually Taken, then changes to Not Taken for one execution instance, then returns back to being continually Taken. In one embodiment, if the SCP entry 900 made a mis-prediction, the SCP entry 900 is trained only if the useful bit 912 is false, whereas if the useful bit 912 is true, then the useful bit 912 is set to false such that the SCP entry 900 may be trained if it makes another mis-prediction.

In the set-associative embodiment of FIG. 10B, the SCP entry 900 also includes a tag field 914. The tag 914 may be a hash of the fetch address of the previous FBlk, i.e., the FBlk whose fetch address is hashed and used as the index 1093 into the SCP 1001 to select an entry 900 to be written or read, as described in more detail below. The tag 914 may be a hash of at least partially different bits of the fetch address of the previous FBlk than the bits of the fetch address of the previous FBlk hashed to generate the index 1093 into the SCP 1001.

Advantageously, each SCP entry 900 holds a relatively small number of bits (e.g., 25 in one embodiment) such that the SCP 1001 is small and fast enough to provide a SCP entry 900 each clock cycle, as described below. More specifically, the HNFAI 902, being a hash of the fetch address of the FBlk and not the full fetch address of the FBlk, is not sufficient for the instruction fetch pipeline 500 to fetch the FBlk from the instruction cache 101. In other words, the nature of a hash function is such that the full fetch address cannot be regenerated from the hash of the fetch address. Rather, only the full fetch address of the FBlk, which is generated by the FBPU 1102 (i.e., current FVA 412 that is included in the FBD 452 of the FBlk, which is the next FVA 449 generated on the previous clock cycle), is sufficient to fetch the FBlk from the instruction cache 101. However, advantageously, the HNFAI 902 is sufficient to initiate the accesses to the BTB 152 and BPs 154, and the information output by the SCP 1001 is small enough such that the SCP 1001 may generate a new output each clock cycle, as described below.

FIG. 10A is an example block diagram of an SCP 1001 in accordance with embodiments of the present disclosure. In one embodiment, the SCP 1001 comprises a random-access memory (RAM) whose locations hold SCP entries 900. The SCP 1001 receives an input 1003 and provides an output 1005 that is the entry 900 selected by the input 1003. Thus, the embodiment of FIG. 10A is arranged similar to a tag-less direct-mapped cache memory. As shown, and as described below in more detail with respect to FIG. 11, at least a portion of the output 1005 is fed back to the input 1003 (e.g., through a multiplexer 1171 of FIG. 11) to use for performing the next access during the next clock cycle. The SCP 1001 is designed to include only as many entries as possible to remain a single-cycle predictor, i.e., to support a total round-trip time that is less than a clock cycle. In one embodiment, the SCP 1001 comprises a RAM with 2048 entries 900. However, other embodiments are contemplated with a different number of SCP 1001 entries. In one embodiment, the HNFAI 902 of the output 1005 (shown as HNFAI [J−1] in FIG. 11) is thirteen bits, and the input 1003 comprises the lower eleven bits of the HNFAI 902. However, other embodiments are contemplated in which the portion of the HNFAI 902 used as the input 1003 is different.

As shown, the output 1005 includes the HNFAT, HNFAI, BrDir-S, IndBr-S, and useful bit of the SCP entry 900 of FIG. 9. The input 1003 includes at least a portion of the HNFAI, which is shown in FIG. 10A as a hashed current fetch address index (HCFAI) because the HNFAI, the hash of the next fetch address produced by the previous FBlk, on the next clock cycle becomes the fetch address of the current FBlk, which is the FBlk that immediately succeeds the previous FBlk.

FIG. 10B is an example block diagram of an SCP 1001 in accordance with alternate embodiments of the present disclosure. The SCP 1001 of FIG. 10B is similar in some respects to the SCP 1001 of FIG. 10A, but also includes tag compare logic 1097 and a mux 1099. Additionally, the input 1003 to the SCP 1001 of FIG. 10B comprises an index 1093 and a tag 1095. The SCP 1001 of FIG. 10B is arranged similar to a set-associative cache memory that includes multiple ways. The embodiment of FIG. 10B includes two ways such that the input 1003 selects a set of two entries 900. However, other embodiments are contemplated that include more than two ways. As described above, in the set-associative embodiment of FIG. 10B, each SCP entry 900 also includes a tag field 914. The tag 914 of each of the two selected entries 900 is provided to the tag compare logic 1097 which compares each of them with the input tag 1095. Based on the comparison, the tag compare logic 1097 controls the mux 1099 to select the entry 900 with a matching tag 914 for provision on the output 1005. In one embodiment, if neither tag 914 matches the input tag 1095, then one of the entries 900 of the selected set if provided on the output 1005, e.g., way 0 as a default.

The set-associative embodiment of FIG. 10B may reduce, relative to a direct-mapped embodiment such as FIG. 10A, the detrimental effect on prediction accuracy caused by aliasing of the hashed index of multiple FBlks to the same entry 900 of the SCP 1001. That is, a set-associative embodiment having N ways may result in less conflict misses since predictions associated with N different FBlks can concurrently reside in the same set of the set-associative SCP 1001 without one FBlk pushing the other FBlk out of the SCP 1001, and the used entry 900 is based on a tag match. The set-associative embodiment may result in less conflict misses but may require fewer entries 900 relative to a direct-mapped embodiment in order to accommodate the additional latency associated with tag comparisons and muxing and still remain a single-cycle predictor. That is, as in the embodiment of FIG. 10A, the SCP 1001 of FIG. 10B is designed to include only as many entries as possible to remain a single-cycle predictor, i.e., to support a total round-trip time that is less than a clock cycle. With respect to the overall prediction accuracy of the SCP 1001, the improvement attributed to the reduced aliasing effects of set-associative embodiments may or may not be offset by the fewer entries 900 of the set-associative embodiment relative to the direct-mapped embodiments.

Figure 11:
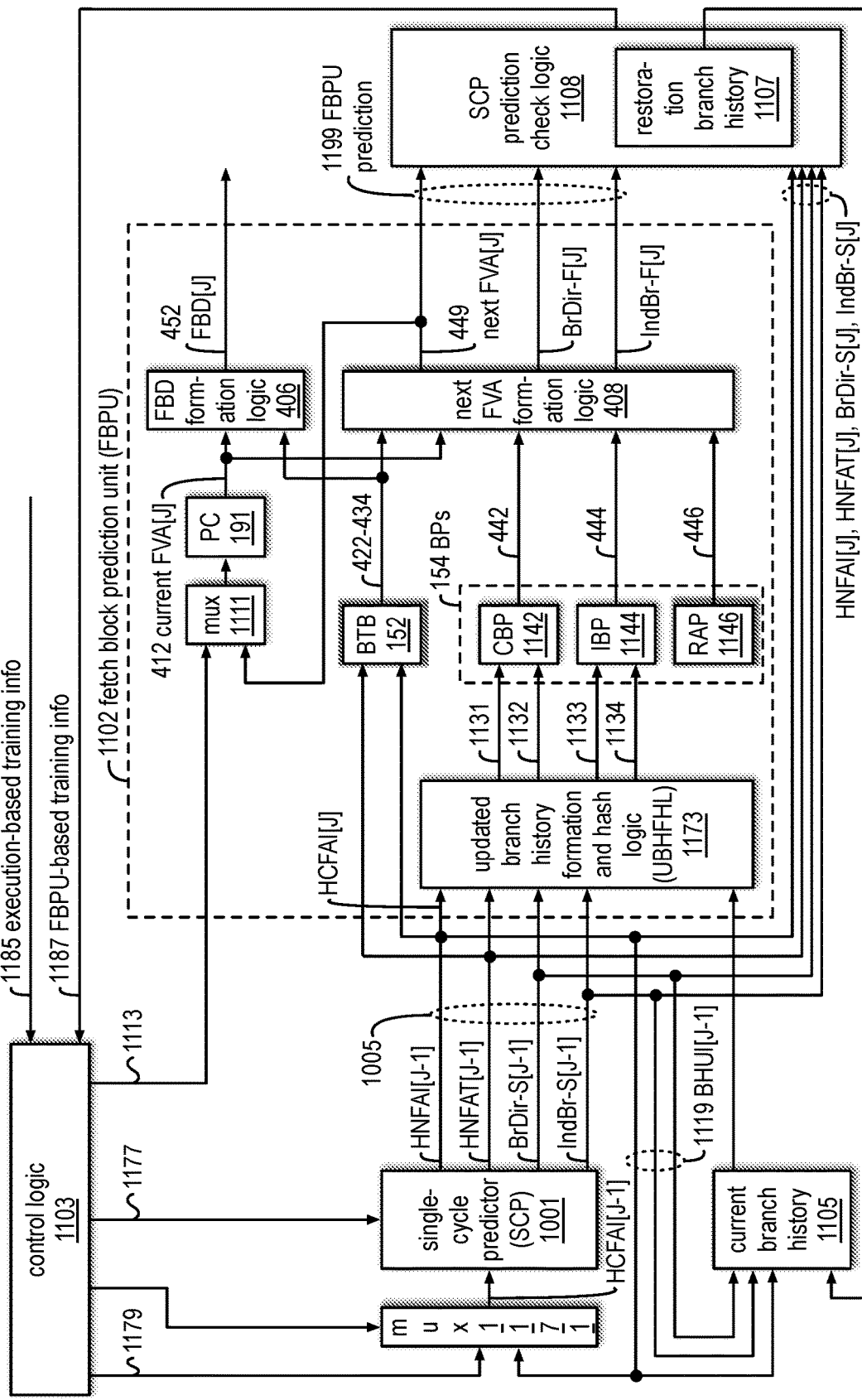
FIG. 11 is an example block diagram of the prediction unit of FIG. 1 in accordance with embodiments of the present disclosure.

FIG. 11 is an example block diagram of the PRU 102 of FIG. 1 in accordance with embodiments of the present disclosure. The PRU 102 includes the SCP 1001, the FBPU 1102, a mux 1171 that provides the input 1003 to the SCP 1001, control logic 1103, current branch history 1105, and SCP prediction check logic 1108. The SCP prediction check logic 1108 includes a restoration branch history 1107. In the embodiment of FIG. 11, the SCP 1001 is a direct-mapped type described with respect to FIG. 10A. The FBPU 1102 includes updated branch history formation and hash logic (UBHFHL) 1173, the BTB 152 of FIG. 4, a return address predictor (RAP) 1146 that predicts the target address of return instructions (return target address 446), a conditional branch predictor (CBP) 1142 that predicts the direction (Taken or Not Taken) of conditional branch instructions (conditional branch direction 442), an indirect branch predictor (IBP) 1144 that predicts the target address of indirect branch instructions (indirect branch target address 444), the PC register 191 of FIG. 1, a mux 1111 whose output is coupled to the input of the PC 191, and the next FVA formation logic 408 and the FBD formation logic 406 of FIG. 4.

As described above, the SCP 1001 holds SCP entries 900, e.g., of FIG. 9. In response to its input 1003 (i.e., the output of the mux 1171), the SCP 1001 selects one of its SCP entries 900 and provides the selected SCP entry 900 on its output 1005, shown in FIG. 11 as HNFAI[J−1], HNFAT[J−1], BrDir-S[J−1], and IndBr-S[J−1], which respectively refer to a first hash (used as an index) of the next fetch address produced by a FBlk denoted[J−1], a second hash (used as a tag) of the next fetch address produced by FBlk[J−1], the branch direction produced by FBlk[J−1], and the indicator of whether FBlk[J−1] is terminated by an indirect branch instruction. The BrDir-S[J−1], IndBr-S[J−1], and one or more bits of the HNFAI[J−1] are shown collectively as BHUI 1119. The mux 1171 receives as one input at least a portion of the HNFAI[J−1] fed back from the output 1005 of the SCP 1001. The mux 1171 receives as another input a training and restart index 1179 provided by the control logic 1103. In one embodiment, for example, the HNFAI[J−1] is a thirteen-bit value, and eleven bits of the HNFAI[J−1] are used as the input to the mux 1171.

During normal operation, the mux 1171 selects the HNFAI[J−1] output by the SCP 1001 on the current clock cycle, which becomes the HCFAI[J−1], shown as the output of mux 1171, on the next clock cycle. However, when the SCP 1001 is being trained (i.e., updated), the control logic 1103 may control the mux 1171 to select the training and restart index 1179 so that the control logic 1103 may write the selected SCP entry 900 with training information 1177. Additionally, after training of the SCP 1001 and/or correction of the PC 191, the control logic 1103 may control the mux 1171 to select the training and restart index 1179 to re-start the SCP 1001 at a different SCP entry 900 than would have been selected by the fed-back HNFAI[J−1].

The training information 1177 is generated by the control logic 1103 using either execution-based training information 1185 or FBPU-based training information 1187. The execution-based training information 1185 may be received from the DEC 112, the execution units 114, and/or the PCL 132, whereas the FBPU-based training information 1187 may be received from the SCP prediction check logic 1108. The training information 1185/1187 may include the next fetch address produced by the previous FBlk, the branch direction produced by the previous FBlk, and an indication of whether the previous FBlk is terminated by an indirect branch instruction. The training information 1185/1187 may also include the fetch address of the previous FBlk, which the control logic 1103 hashes to generate the training index 1179 that selects the SCP entry 900 is to be written, i.e., the entry 900 that made the mis-prediction. The control logic 1103 hashes the next fetch address produced by the previous FBlk for writing into the HNFAI 902 and hashes the next fetch address produced by the previous FBlk, in at least a partially different manner, for writing into the HNFAT 904. The control logic 1103 writes the branch direction produced by the previous FBlk into the BrDir-S 906 and writes the indirect branch instruction indication to the IndBr-S 908.

The current branch history 1105 and the restoration branch history 1107 each hold three different branch histories related to prior executions of FBlks: a global branch history (GHist), a path history (CPHist), and an indirect branch path history (IPHist). In one embodiment, the different branch histories are held in respective shift registers. For example, in one embodiment the current GHist and the restoration GHist are held in respective 128-bit shift registers, the current CPHist and the restoration CPHist are held in respective 15-bit shift registers, and the current IPHist and the restoration IPHist are held in respective 24-bit shift registers.

In one embodiment, each time the SCP 1001 makes a prediction, the BrDir-S[J–1] is shifted into the current GHist, a bit of the HNFAI[J–1] (which reflects the fetch address of the current FBlk, e.g., bit 1) is shifted into the current CPHist, and three bits of the HNFAI[J–1] (which also reflects the fetch address of the current FBlk, e.g., bits 3:1) are shifted into the current IPHist if the IndBr-S[J–1] indicates the previous FBlk is terminated by an indirect branch instruction. Additionally, each time the FBPU 1102 makes a prediction, the BrDir-F[J] (described in more detail below) output by the next FVA formation logic 408 is shifted into the restoration GHist, a bit of a hash of the next FVA 449 (e.g., bit 1) is shifted into the restoration CPHist, and three bits of a hash of the next FVA 449 (e.g., bits 3:1) are shifted into the restoration IPHist if the IndBr-F[J] (described in more detail below) output by the next FVA formation logic 408 indicates the previous FBlk is terminated by an indirect branch instruction. When a mis-prediction by the SCP 1001 is detected, the current branch history 1105 may be updated from the restoration branch history 1107.

The UBHFHL 1173 receives the current branch history 1105: GHist, CPHist, and IPHist. The UBHFHL 1173 forms the updated branch history using the current branch history 1105 and the BHUI 1119. More specifically, the UBHFHL 1173 strips off the oldest bit of the received current GHist and appends in the BrDir-S[J–1]; the UBHFHL 1173 strips off the oldest bit of the received current CPHist and appends in a bit of the HNFAI[J–1] (e.g., bit 1); and the UBHFHL 1173 strips off the three oldest bits of the received current IPHist and appends in three bits of the HNFAI[J–1] (e.g., bits 3:1) if the IndBr-S[J–1] indicates the previous FBlk is terminated by an indirect branch instruction. The results are referred to collectively as the updated branch history (not shown) and are referred to individually as the updated GHist, updated CPHist, and updated IPHist. In one embodiment, in a given clock cycle, the updated branch history is formed by the UBHFHL 1173 with the state of the current branch history 1105 early in the clock cycle before being updated using the output 1005 provided by the SCP 1001 later in the clock cycle.

The UBHFHL 1173 hashes the HNFAI[J–1] with varying lengths of combined updated GHist and CPHist (e.g., 0, 5, 15, 43, 128 bits) to generate indexes 1131 that are provided to the CBP 1142. The UBHFHL 1173 hashes the HNFAT [J–1] with varying lengths of combined updated GHist and CPHist (e.g., 5, 15, 43, 128 bits) to generate tags 1132 that are provided to the CBP 1142. In one embodiment, the CBP 1142 comprises a bimodal table and four tagged tables that are respectively indexed by the indexes 1131, and tags of the four tagged tables are compared with the tags 1132. In one embodiment, the CBP 1142 may be a predictor that employs any of various well-known tagged table-based history length branch prediction methods. When accessed, the CBP 1142 provides a conditional branch direction 442 that is provided to the next FVA formation logic 408. Advantageously, because the SCP 1001 provides a HNFAI[J–1] each clock cycle which the UBHFHL 1173 hashes into the index 1131, an access to the CBP 1142 may be initiated each clock cycle, which enables the CBP 1142 to provide a conditional branch direction 442 each clock cycle, which may be used by the FBD formation logic 406 to provide a FBD 452 each clock cycle.

The UBHFHL 1173 hashes the HNFAI[J–1] with varying lengths of combined updated GHist and IPHist (e.g., 5, 15, 43 bits) to generate indexes 1133 that are provided to the IBP 1144. The UBHFHL 1173 hashes the HNFAT[J–1] with varying lengths of combined updated GHist and IPHist (e.g., 5, 15, 43 bits) to generate tags 1134 that are provided to the IBP 1144. In one embodiment, the IBP 1144 comprises three tagged tables that are respectively indexed by the indexes 1133, and tags of the three tagged tables are compared with the tags 1134. In one embodiment, the IBP 1144 may also employ tagged table-based history length branch prediction methods. In one embodiment, the IBP 1144 only handles demonstrated polymorphic branches, whereas monomorphic branches are handled by the BTB 152 that effectively serves as a bimodal table. When accessed, the IBP 1144 provides an indirect branch target address 444 that is provided to the next FVA formation logic 408. Advantageously, because the SCP 1001 provides a HNFAI[J–1] each clock cycle which the UBHFHL 1173 hashes into the index 1133, an access to the IBP 1144 may be initiated each clock cycle, which enables the IBP 1144 to provide an indirect branch target address 444 each clock cycle, which may be used by the FBD formation logic 406 to provide a FBD 452 each clock cycle.

The BTB 152 is indexed by the HNFAI[J–1], and tags of the set selected by the HNFAI[J–1] are compared with the HNFAT[J–1] to determine whether the lookup results in a hit in the BTB 152 and, if so, the hit BTB entry 200 is provided as outputs 422-434 of FIG. 4. The outputs 422-434 of the BTB 152 are also provided to the FBD formation logic 406 and to the next FVA formation logic 408. Advantageously, because the SCP 1001 provides a HNFAI[J–1] each clock cycle, an access to the BTB 152 may be initiated each clock cycle, which enables the BTB 152 to provide a BTB entry 200 each clock cycle, which may be used by the FBD formation logic 406 to provide a FBD 452 each clock cycle.

The RAP 1146 provides a return target address 446 that is provided to the next FVA formation logic 408. If the termination type 434 predicted by the BTB 152 indicates the current FBlk is terminated by a return instruction, the RAP 1146 provides the top entry of its stack as the return target address 446 to the next FVA formation logic 408. Conversely, if the termination type 434 predicted by the BTB 152 indicates the current FBlk is terminated by a call instruction, the current FVA 412 is used to compute the return address, which is the address of next instruction after the call instruction, and the computed return address is pushed onto the stack of the RAP 1146. An access to the RAP 1146 may be initiated each clock cycle, which enables the RAP 1146 to provide a return target address 446 each clock cycle, which may be used by the FBD formation logic 406 to provide a FBD 452 each clock cycle.

The PC register 191 holds the current FVA 412 that is provided as an input to the FBD formation logic 406 and the next FVA formation logic 408. In one embodiment, the instruction set architecture (ISA) of the processor 100 supports instructions that are either two bytes long or four bytes long, and the ISA requires instructions to be aligned on two-byte address boundaries. Thus, the size of the PC 191, as well as the size of fetch addresses (e.g., the current FVA 412 and next FVA 449), are N−1 bits, where N is the size of a virtual address. In the case of an event that requires the PC 191 to be corrected, e.g., the DEC 112 or execution units 114 detect a mis-prediction by the FBPU 1102 (which may result in a micro-architectural abort process) or the SCP prediction check logic 1108 detects a mis-prediction by the SCP 1001, the control logic 1103 provides a correction PC 1113 to the mux 1111, which selects the correction PC 1113 for writing into the PC 191. In this case, the execution-based training information 1185 or the FBPU-based training information 1187 may be provided to the control logic 1103 to train the SCP 1001. Additionally, in the case that the DEC 112 or execution units 114 detect a mis-prediction by the FBPU 1102, the BTB 152, RAP 1146, CBP 1142, and/or IBP 1144 may also be trained using the execution-based training information 1185. The FBPU 1102 may be stalled until the SCP 1001 is trained and the PRU 102 is restarted.

However, during normal operation the mux 1111 selects the next FVA 449 that is provided by the next FVA formation logic 408 for writing into the PC register 191. In this manner, a single-cycle fetch address loop advantageously exists around the next FVA formation logic 408 within the FBPU 1102, rather than a multi-cycle fetch address loop around the PRU 102 as in the embodiment of FIG. 4 as described above. The single-cycle hashed fetch address loop around the SCP 1001 and the single-cycle full fetch address loop around the next FVA formation logic 408 operate in a pipelined fashion to facilitate the production of an FBD 452 each clock cycle, which facilitates the fetching of a FBlk by the pipelined IFU 106 each clock cycle, as described above, to increase the likelihood that the back-end 130 is not starved.

As described above, the FBD formation logic 406 receives the current FVA 412, the BTB hit indicator 422, the predicted set index 424, the predicted way number 426, and the fetch block length 428 and gathers them to form a FBD 452 to push into an entry 300 of the FBD FIFO 104. During normal operation, e.g., as long as the FBD FIFO 104 is not full and no mis-prediction is detected that requires update of the PC 191 (which may also involve training of the SCP 1001 and/or FBPU 1102), the FBD formation logic 406 provides a FBD 452 to the FBD FIFO 104 each clock cycle.

As described above, the next FVA formation logic 408 receives the BTB hit indicator 422, the fetch block length 428, the PC-relative target address 432, the termination type 434, the conditional branch direction 442, the indirect target address 444, the return target address 446, and the current FVA 412 and uses them to generate the next FVA 449. During normal operation, e.g., as long as the FBD FIFO 104 is not full and no mis-prediction is detected that requires update of the PC 191 (which may also involve training of the SCP 1001 and/or FBPU 1102), the next FVA formation logic 408 provides a next FVA 449 each clock cycle. If BTB hit 422 is false, the next FVA formation logic 408 predicts a maximum length sequential termination type instruction fetch block. That is, the next FVA formation logic 408 generates a value of the next FVA 449 that is the sum of the FVA 412 and the maximum fetch block length (e.g., 64 bytes). If BTB hit 422 is true, the next FVA formation logic 408 generates the next FVA 449 based on the termination type 434 and the remaining inputs. For example, if the termination type 434 indicates a PC-relative branch, then if the conditional branch direction 442 indicates "Taken," the next FVA formation logic 408 outputs the PC-relative target address 432 as the next FVA 449 and otherwise outputs the sum of the FVA 412 and the fetch block length 428. If the termination type 434 indicates an indirect branch, the next FVA formation logic 408 outputs the indirect branch target address 444 as the next FVA 449. If the termination type 434 indicates a return instruction, the next FVA formation logic 408 outputs the return target address 446 as the next FVA 449. If the termination type 434 indicates a stop type instruction, the next FVA formation logic 408 outputs the sum of the FVA 412 and the fetch block length 428 as the next FVA 449.

Additionally, the next FVA formation logic 408 generates the BrDir-F indicator and the IndBr-F indicator each clock cycle. In one embodiment, the next FVA formation logic 408 generates a value on the BrDir-F indicator that indicates Taken if the termination type 434 indicates a stop instruction, an unconditional branch instruction (e.g., call, return, indirect branch, unconditional jump), or a conditional branch instruction and the conditional branch direction 442 indicates Taken. Otherwise, the next FVA formation logic 408 generates a value on the BrDir-F indicator that indicates Not Taken. In one embodiment, the next FVA formation logic 408 generates a true value on the IndBr-F indicator if the termination type 434 indicates an indirect branch instruction, and otherwise generates a false value on the IndBr-F indicator. The next FVA 449, the BrDir-F indicator, and the IndBr-F indicator are provided to the SCP prediction check logic 1108 each clock cycle and are used to update the restoration branch history 1107, as described above. Collectively, the next FVA 449, the BrDir-F indicator, and the IndBr-F indicator are referred to as the FBPU prediction 1199, as shown in FIG. 11. In one embodiment, the next FVA 449, the BrDir-F[J], the IndBr-F[J], and the termination type 434 are also provided to the mid-end 120 and the back-end 130 to enable them to detect a mis-prediction by the FBPU 1102.

The SCP prediction check logic 1108 also receives a HNFAI[J], a HNFAT[J], a BrDir-S[J], and a IndBr-S[J] from the SCP 1001 each clock cycle. Each clock cycle, the SCP prediction check logic 1108 compares the BrDir-F[J] and the IndBr-F[J] generated by the next FVA formation logic 408 for a FBlk[J] against the BrDir-S[J] and the IndBr-S[J], respectively, that were output by the SCP 1001 earlier in the PRU 102 pipeline, e.g., 3 clock cycles earlier, as predictions of what will be produced by FBlk[J], as described in more detail below with respect to FIGS. 12 and 13. If the comparison indicates a mismatch, the SCP prediction check logic 1108 provides FBPU-based training information 1187 to the control logic 1103 for training of the SCP 1001 as described above. Additionally, the SCP prediction check logic 1108 hashes the next FVA 449 produced by FBlk[J] to generate a hashed index and a hashed tag which it compares against the HNFAI[J] and the HNFAT[J], respectively, that were output by the SCP 1001 as a prediction of a hash of the next fetch address produced by FBlk[J] earlier in the PRU 102 pipeline. If the comparison indicates a mismatch, the SCP prediction check logic 1108 provides FBPU-based training information 1187 to the control logic 1103 for training of the SCP 1001 as described above. In one embodiment, the HNFAT[J] need not be checked because a check of the HNFAI[J] suffices as a check of the HNFAT[J].

As described, the SCP 1001 is designed to provide a new prediction 1005 (e.g., HNFAI[J−1], HNFAT[J−1], BrDir-S

[J−1], and IndBr-S[J−1]) associated with a new FBlk each clock cycle. The total round-trip time associated with the loop around the SCP 1001 is less than a clock cycle, e.g., setup time for the SCP 1001 input, the latency of the SCP 1001 from input to output of the entry 900 specified by the input (including tag comparison and muxing time in a set-associative embodiment), and the latency associated with the travel time around and through the mux 1171 back to the input of the SCP 1001.

FIG. 12 is an example block diagram illustrating stages of the pipeline of the PRU 102 of FIG. 11 in accordance with embodiments of the present disclosure. In the embodiment of FIG. 12, there are five stages of the PRU 102 pipeline, denoted PR1 1201, PR2 1202, PR3 1203, PR4 1204, and PR5 1205. However, other embodiments are contemplated in which the number of stages is different than five. Regardless of the number of stages, the SCP 1001 is a single-cycle predictor, although the FBPU 1102 may be a single-cycle or a multi-cycle predictor. That is, one or more clock cycles may be required from the time that the FBPU 1102 receives the SCP 1001 output 1005 until the next FVA 449, BrDir-F[J], and IndBr-F[J] are generated and the next FVA 449 is written to the PC 191 and available as the current FVA 412 to the next FVA formation logic 408 and a FBD 452 is produced for writing into the FBD FIFO 104. Thus, the PRU 102 includes at least two stages, one for operation of the SCP 1001 and one or more for operation of the FBPU 1102.

In the PR1 1201 stage, an access is made to the SCP 1001 to obtain the HNFAI, HNFAT, BrDir-S, and IndBr-S produced by a previous FBlk, e.g., FBlk[J−1] as shown in FIG. 11. The SCP 1001 is accessed using at least a portion of the output 1005 generated by the SCP 1001 in the immediately previous clock cycle (e.g., eleven bits of the HNFAI[J−1]) that is fed back to the input 1003 of the SCP 1001. As described above, HNFAI and HNFAT are hashes of the next fetch address produced by the previous FBlk that are written into the SCP entry 900 during its training, and the BrDir-S and IndBr-S indicate values produced by the previous FBlk that are written into the SCP entry 900 during its training. The training of the SCP 1001 is also described below with respect to FIG. 14. During training, the next fetch address, the branch direction, and indirect branch indicator produced by the previous FBlk may be provided by the FBPU 1102, e.g., next FVA 449, BrDir-F, and IndBr-F. Or, the next fetch address, branch direction, and indirect branch indicator produced by the previous FBlk may be provided by the DEC 112, execution units 114, or PCL 132. The fetch address of the previous FBlk may also be provided and hashed in order to generate the input 1003 to the SCP 1001 for selecting the SCP entry 900 to be written, e.g., indicated on training index 1179.

In the PR2 1202 stage, the BrDir-S, IndBr-S, bits of the HNFAI, and the current branch history 1105 are used by the UBHFHL 1173 to produce an updated branch history, as described above with respect to FIG. 11. The UBHFHL 1173 then hashes the updated branch history with the HNFAI and the HNFAT to generate indexes 1131 and 1133 and tags 1132 and 1134 used to access the CBP 1142 and the IBP 1144, as described above with respect to FIG. 11. PR2 1202 is also used as setup time for accesses to the FBPU 1102 structures, e.g., RAMs of the BTB 152, CBP 1142, and IBP 1144. In one embodiment, the RAP 1146 is a flip-flop-based structure, and PR2 1202 is also used as setup time for the flip-flops. Additionally, the current branch history 1105 is updated using the BrDir-S, IndBr-S, and bits of the HNFAI, as described above, e.g., the BrDir-S is shifted into the current GHist, a bit of the HNFAI is shifted into the current CPHist, and three bits of the HNFAI are shifted into the current IPHist if the IndBr-S indicates the previous FBlk was terminated by an indirect branch instruction.

In the PR3 1203 stage, the access to the BTB 152 is initiated using the HNFAI, the access to the CBP 1142 is initiated using the index 1131, the access to the IBP 1144 is initiated using the index 1133, and the access to the top entry of the RAP 1146 stack is initiated. The accesses are initiated in order to obtain, in PR4 1204, the BTB hit indicator 422, the predicted set index 424, the predicted way number 426, the fetch block length 428, the PC-relative target address 432, the termination type 434, the conditional branch direction 442, the indirect target address 444, and the return target address 446. In one embodiment, BTB tag comparisons may be started using the HNFAT obtained in PR1 1201 to select a BTB entry 200 to obtain the BTB hit indicator 422, the predicted set index 424, the predicted way number 426, the fetch block length 428, the PC-relative target address 432, and the termination type 434 for provision to the FBD formation logic 406 and the next FVA formation logic 408. Additionally, the tags 1132 and 1134 generated in PR2 1202 may be used to start tag comparisons and table selections in the CBP 1142 and IBP 1144, respectively, to obtain the respective conditional branch direction 442 and the indirect target address 444 for provision to the next FVA formation logic 408.

In the PR4 1204 stage, the tag comparisons and table selections started in PR3 1203 are completed to obtain the BTB 152, CBP 1142 and IBP 1144 outputs, and the return target address 446 is obtained from the RAP 1146 all for provision to the next FVA formation logic 408. Also, the current FVA 412—i.e., the full fetch address of the current FBlk, which is the next FVA 449 generated by PR4 1204 in the previous clock cycle and fed back to PR4 in this clock cycle—is read from the PC 191 by the FBD formation logic 406 and next FVA formation logic 408. The next FVA formation logic 408 uses its received inputs to predict the next FVA 449, BrDir-F, and IndBr-F produced by the current FBlk, i.e., the FBlk whose fetch address was hashed for use as an index (HCFAI) to initiate accesses to the FBPU 1102 in PR3 1203 and whose fetch address was hashed for use as a tag (HCFAT) to perform tag compares completed in PR4 1204. Additionally, the FBD formation logic 406 uses its received inputs to form a FBD 452 that describes the current FBlk and pushes the formed FBD 452 into the FBD FIFO 104. Still further, the restoration branch history 1107 is updated using the next FVA 449, BrDir-F, and IndBr-F as described above. Finally, the RAP 1146 is updated as needed, i.e., if the instruction terminating the current FBlk is a return instruction then the top entry of the RAP 1146 is popped, and if the instruction terminating the current FBlk is a call instruction then a return address is computed and pushed onto the top entry of the RAP 1146.

In the PR5 1205 stage, the SCP prediction check logic 1108 checks for a mis-prediction by the SCP 1001. More specifically, the SCP prediction check logic 1108 compares the "correct" BrDir-F and IndBr-F that in the previous clock cycle in PR4 1204 the FBPU 1102 predicted will be produced by the current FBlk against the BrDir-S and IndBr-S, respectively, that 3 clock cycles earlier in PR1 1201 the SCP 1001 predicted will be produced by the current FBlk and that were fed forward to PR5 1205 to be checked this clock cycle. Additionally, the SCP prediction check logic 1108 hashes (in one embodiment the VMID 197 and PM 199 are also hashed, as described above) the next FVA 449 that in the previous clock cycle in PR4 1204 the FBPU 1102 predicted will be produced by the current FBlk to generate a "correct"

HNFAI and HNFAT. The SCP prediction check logic 1108 then compares the "correct" HNFAI and HNFAT against the HNFAI and HNFAT, respectively, that 3 clock cycles earlier in PR1 1201 the SCP 1001 predicted will be produced by the current FBlk and that were fed forward to PR5 1205 to be checked this clock cycle. If the SCP prediction check logic 1108 determines that the SCP 1001 mis-predicted: the PRU 102 pipeline is flushed, the SCP 1001 is trained, the current branch history 1105 is restored from the restoration branch history 1107, and the PRU 102 is restarted using the "correct" next FBlk information, as described in more detail below with respect to FIG. 14. In one embodiment, the PR5 1205 stage overlaps with the first stage of the instruction fetch pipeline 500 of FIG. 5 such that the first stage of the instruction fetch pipeline 500 may start its process of fetching the current FBlk based on the FBD 452 that describes the current FBlk and that was generated the previous clock cycle.

Figure 13:
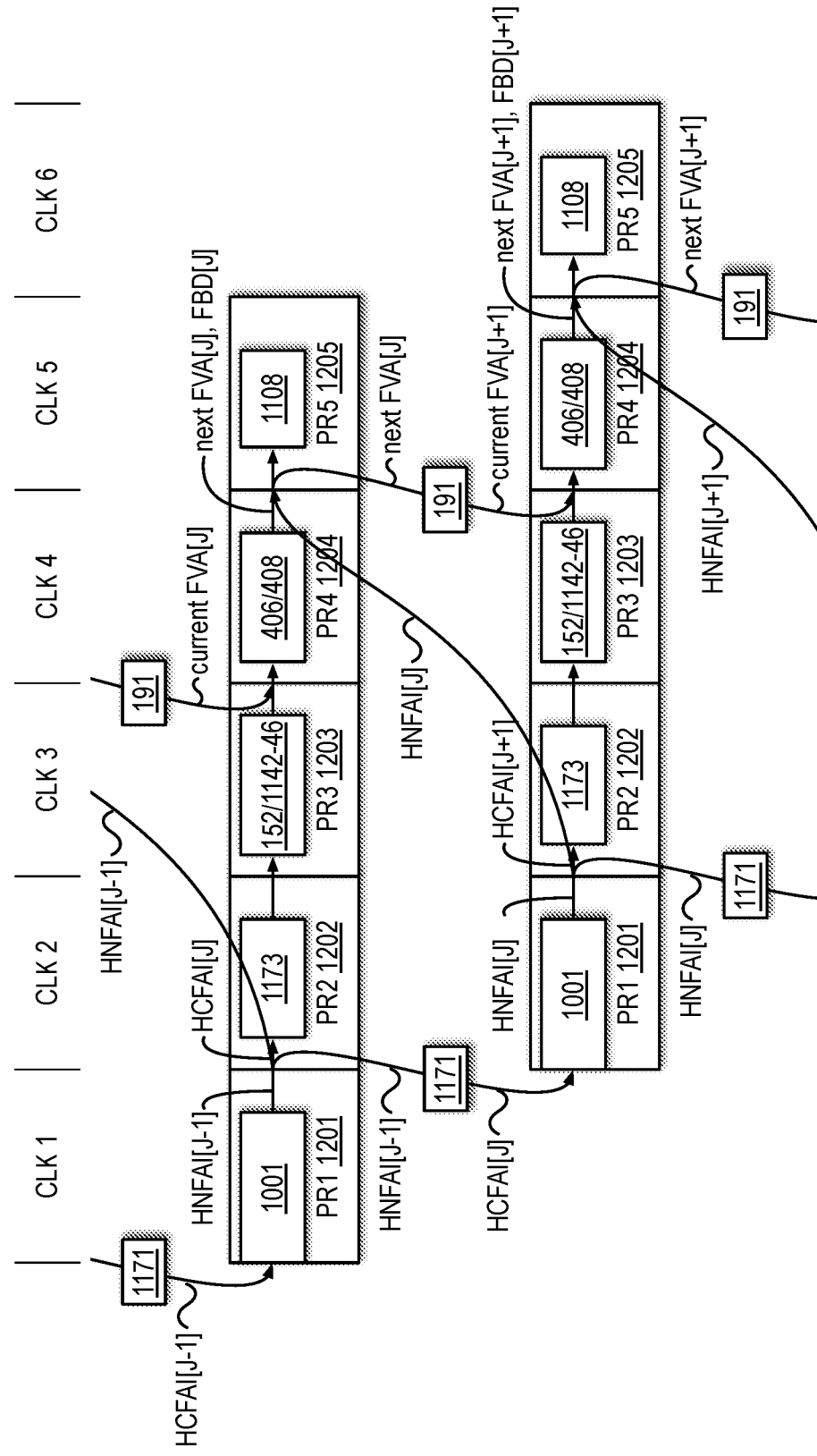
FIG. 13 is an example pipeline timing diagram illustrating operation of the prediction unit of FIG. 11 and its pipeline of FIG. 12 in accordance with embodiments of the present disclosure.

As may be understood from FIGS. 12 and 13, although not shown, the PRU 102 may include pipeline stage registers or other sequential logic circuits that form the PRU 102 pipeline stages. For example, in one embodiment, the mux 1171 may be a muxed-register. Alternatively, the SCP 1001 RAM may include sequential logic circuits that receive the HCFAI during the setup time and latch in the value at the rising edge of the clock cycle. For another example, staging registers may be included at the input to the UBHFHL 1173, the FBD formation logic 406, the next FVA formation logic 408, and the SCP prediction check logic 1108. For another example, a series of staging registers may feed forward the HNFAI, HNFAT, BrDir-S, and IndBr-S to the SCP prediction check logic 1108. Finally, the PC 191 may operate as a staging register.

As may be observed from the description of FIG. 11, as well as from the description of the remaining Figures, for a first series of clock cycles the SCP 1001 provides to the FBPU 1102 a first series of predictions (e.g., HNFAI, HNFAT, BrDir-S, and IndBr-S) associated with a series of FBlks. The first series of predictions includes the information needed by the FBPU 1102 to initiate its lookups during a second series of clock cycles that follows the first series of clock cycles (e.g., by two clock cycles between the PR1 and PR3 stages in the example of FIG. 12) and to provide a second series of predictions and a series of FBDs 452 during a third series of clock cycles that follows the first series of clock cycles by a latency of the FBPU 1102, e.g., 3 clock cycles in the embodiment of FIG. 12, to facilitate a fetch of a FBlk each clock cycle from the instruction cache 101 to reduce the likelihood that the back-end 130 is starved.

In one embodiment, depending upon the contents of the FBlk, the branch history update information may be determined by the DEC 112 at instruction decode time, rather than by the EUs 114 at instruction execution time. For example, in the case of an FBlk having no branch instructions, the DEC 112 may be able to determine, without the need to execute the instructions in the FBlk, the length of the FBlk, that the termination type is sequential, that the branch direction is not taken, and that there is no indirect branch instruction present in the FBlk. Thus, in the context of SCP embodiments, the terms execution or executing should be understood to include decode or decoding and/or execution or executing.

FIG. 13 is an example pipeline timing diagram illustrating operation of the PRU 102 of FIG. 11 and its pipeline of FIG. 12 in accordance with embodiments of the present disclosure. Operation of the PRU 102 pipeline is illustrated in FIG. 13 by describing the processing of a series of predictions associated with a series of successive FBlks in program execution order during a series of six successive clock cycles to provide a series of successive FBDs 452. The series of successive FBlks are referred to as FBlk[J−1], FBlk[J], and FBlk[J+1]. The series of six successive clock cycles are denoted CLK1 through CLK6. The series of successive FBDs 452 are referred to as FBD[J] and FBD[J+1]. More specifically, during a first series of successive clock cycles CLK1 and CLK2 that continues on until a terminating event (e.g., a mis-prediction is detected, or an abort occurs), the SCP 1001 provides a series of outputs associated with the series of FBlks. Each of the outputs includes a HNFAI, as well as a HNFAT, a BrDir-S, and a IndBr-S which are not shown in FIG. 13. The FBPU 1102 uses the series of SCP 1001 outputs to provide the series of FBDs on a second series of successive clock cycles CLK4 and CLK5 that continues on until a terminating event.

The series of FBDs are used by the instruction fetch pipeline 500 to fetch successive FBlks from the instruction cache 101. In one embodiment, as described above with respect to FIG. 12, the first stage of the instruction fetch pipeline 500 overlaps with the PR5 1205 stage of the PRU 102 pipeline, i.e., the prediction check stage. Therefore, advantageously the first stage of the instruction fetch pipeline 500 may start its process of fetching previous FBlk[J] described by FBD[J] during CLK5 and may start its process of fetching current FBlk[J+1] described by FBD[J+1] during CLK6.

The operation of each pipeline stage is described with respect to FIG. 12. Therefore, the description of FIG. 13 is focused on the interactions between pipeline stages with respect to the predicting of different FBlks in the series of FBlks rather than describing the operation of each pipeline stage in detail.

In FIG. 13, various signals/outputs/values of FIG. 11 are referred to with a suffix in square brackets. For example, HCFAI[J−1] refers to the hashed current fetch address index of FBlk[J−1], which is also the prediction made by the SCP 1001 of the HNFAI produced by FBlk[J−2]; HNFAI[J−1] refers to the prediction made by the SCP 1001 of the hashed next fetch address index produced by FBlk[J−1], which is also the HCFAI of FBlk[J], denoted HCFAI[J]; HNFAI[J] refers to the prediction made by the SCP 1001 of the hashed next fetch address index produced by FBlk[J], which is also the HCFAI of FBlk[J+1], denoted HCFAI[J+1]; HNFAI[J+1] refers to the prediction made by the SCP 1001 of the hashed next fetch address index produced by FBlk[J+1], which is also the HCFAI of FBlk[J+2], denoted HCFAI[J+2] (not shown); current FVA[J] refers to the current FVA 412 of FBlk[J] provided by PC 191; next FVA[J] refers to the prediction made by the FBPU 1102 of the next FVA 449 produced by FBlk[J], which is also the current FVA 412 of FBlk[J+1], denoted current FVA[J+1], after being piped through PC 191, as shown.

As illustrated by the example, the second series of successive clock cycles CLK4 through CLK5 in which the series of FBD[J] and FBD[J+1] are provided follows the first series of successive clock cycles CLK1 through CLK2 in which the series of SCP 1001 outputs 1005 are provided by a three-clock pipeline latency of the FBPU 1102. Although the PRU 102 pipeline embodiment of FIG. 12 includes a three-clock pipeline latency of the FBPU 1102, other embodiments are contemplated in which the pipeline latency of the FBPU 1102 is different than three clocks, although the pipeline latency is at least one clock. For example, as described above, the access to the SCP 1001 in PR1 1201 in CLK1 provides the information for (1) setting up and starting the lookups in the BTB 152, CBP 1142, and IBP 1144 for FBlk[J] and for (2) setting up the next SCP 1001 access in PR1 1201 in CLK2 for FBlk[J]. The latter is a single-cycle loop timing path from the SCP 1001 output 1005 back around to the SCP 1001 input 1003 after passing through the input mux 1171. Whereas the former, in the embodiment of FIGS. 12 and 13, requires an extra clock cycle of timing from SCP 1001 output 1005 to the inputs of the RAMs of the BTB 152, CBP 1142, and IBP 1144, which is provided by PR2 1202. However, other embodiments are contemplated in which the timing is such that the PR2 1202 stage may be omitted, e.g., the SCP 1001 output 1005 occurs soon enough in the PR1 1201 cycle and/or the setup time of the RAMs is small enough and/or the propagation delay through the UBHFHL 1173 is small enough and/or the lookup time in the RAMs is fast enough such that the lookups in the BTB 152, CBP 1142, and IBP 1144 could be started in the immediately next clock cycle in the immediately next stage after PR1 1201, i.e., the PR2 1202 stage is not needed, such that the pipeline latency is only two clocks. Finally, other embodiments are contemplated in which the pipeline latency is only one clock.

During CLK1, PR1 1201 uses HCFAI[J−1] to access the SCP 1001 to obtain HNFAI[J−1] produced by FBlk[J−1] (as well as HNFAT[J−1], BrDir[J−1], and IndBr[J−1], not shown). HCFAI[J−1] is the HNFAI[J−2] (not shown) produced by FBlk[J−2] that was output by the SCP 1001 on the clock cycle previous to CLK1 and fed back through mux 1171 to the input of the SCP 1001 for use by PR1 1201 in CLK1. HNFAI[J−1] is fed back through mux 1171 as HCFAI[J] to the input of the SCP 1001 for use by PR1 1201 during CLK 2. HNFAI[J−1] is also fed forward through pipeline staging registers (not shown) for use by PR5 1205 during CLK 4 (not shown). HNFAI[J−1] is also fed forward for use by PR2 1202 during CLK 2, in which HNFAI[J−1] is denoted HCFAI[J] having passed through a pipeline staging register (not shown).

During CLK2, PR1 1201 uses HCFAI[J] to access the SCP 1001 to obtain HNFAI[J] produced by FBlk[J] (as well as HNFAT[J], BrDir[J], and IndBr[J], not shown). HNFAI[J] is fed back through mux 1171 as HCFAI[J+1] (not shown) to the input of the SCP 1001 for use by PR1 1201 during CLK 3. HNFAI[J−1] is also fed forward through pipeline staging registers (not shown) for use by PR5 1205 during CLK 5. HNFAI[J−1] is also fed forward for use by PR2 1202 during CLK 3, in which HNFAI[J] is denoted HCFAI[J+1] having passed through a pipeline staging register (not shown). Additionally, in CLK2, PR2 1202 uses HCFAI[J] (as well as HCFAT[J], BrDir-S[J−1], IndBr-F[J−1], and current branch history 1105, not shown) to generate the updated branch history with which to hash the HCFAI[J] and HCFAT[J] to generate indexes 1131 and 1133 and tags 1132 and 1134 of FIG. 11 that are piped forward for use by PR3 1203 in CLK3.

In CLK3, PR2 1202 uses HCFAI[J+1] (as well as HCFAT[J+1], BrDir-S[J], IndBr-F[J], and current branch history 1105, not shown) to generate the updated branch history with which to hash the HCFAI[J+1] and HCFAT[J+1] to generate indexes 1131 and 1133 and tags 1132 and 1134 of FIG. 11 that are piped forward for use by PR3 1203 in CLK4. Additionally, in CLK3, PR3 1203 uses indexes 1131 and 1133 generated in CLK 2 by PR2 1202 to initiate lookups in the BTB 152, CBP 1142 and IBP 1144, and uses the tags 1132 and 1134 generated in CLK 2 by PR2 1202 to start tag comparisons.

In CLK4, PR3 1203 uses indexes 1131 and 1133 generated in CLK 2 by PR2 1202 to initiate lookups in the BTB 152, CBP 1142 and IBP 1144, and uses the tags 1132 and 1134 generated in CLK 2 by PR2 1202 to start tag comparisons. Additionally, in CLK4, PR4 1204 uses the current FVA[J] received from PC 191 (which the PC 191 received as next FVA[J−1] predicted by the FBPU 1102 in CLK3, not shown) along with the outputs of the BTB 152, CBP 1142, IBP 1144, and RAP 1146 to form the next FVA[J] (and the BrDir-F[J] and the IndBr-F[J], not shown) and to form the FBD[J]. The next FVA[J] predicted in CLK4 by PR4 1204 is forwarded through PC 191 and received as current FVA[J+1] by PR4 1204 for use in CLK5.

In CLK5, PR4 1204 uses the current FVA[J+1] received from PC 191 along with the outputs of the BTB 152, CBP 1142, IBP 1144, and RAP 1146 to form the next FVA[J+1] (and the BrDir-F[J+1] and the IndBr-F[J+1], not shown) and to form the FBD[J+1]. The next FVA[J+1] predicted in CLK5 by PR4 1204 is forwarded through PC 191 and received as current FVA[J+2] (not shown) by PR4 1204 for use in CLK6 (not shown). Additionally, in CLK5, PR5 1205 uses the next FVA[J] predicted by the FBPU 1102 in CLK4 to check the HNFAI[J] predicted by the SCP 1001 in PR1 1201 during CLK2 and fed forward (via pipeline staging registers, not shown) to PR5 1205 for use during CLK5. Additionally, although not shown, in CLK5, PR5 1205 uses the BrDir-F[J] and IndBr-F[J] predicted by the FBPU 1102 in CLK4 to check the BrDir-S[J] and IndBr-S[J] predicted by the SCP 1001 in PR1 1201 during CLK2 and fed forward to PR5 1205 for use during CLK5.

In CLK6, PR5 1205 uses the next FVA[J+1] predicted by the FBPU 1102 in CLK5 to check the HNFAI[J+1] predicted by the SCP 1001 in PR1 1201 during CLK3 and fed forward (via pipeline staging registers, not shown) to PR5 1205 for use during CLK6. Additionally, although not shown, in CLK6, PR5 1205 uses the BrDir-F[J+1] and IndBr-F[J+1] predicted by the FBPU 1102 in CLK5 to check the BrDir-S[J+1] and IndBr-S[J+1] predicted by the SCP 1001 in PR1 1201 during CLK3 and fed forward to PR5 1205 for use during CLK6.

As shown in FIG. 11, the next FVA[J] 449 output by the next FVA formation logic 408 is fed back to its input through the PC 191 register as current FVA[J] 412. This is illustrated in FIG. 13. For example, next FVA[J] predicted by PR4 1204 in CLK4 is fed back as an input current FVA[J+1] to PR4 1204 in CLK5, for example, to be used to form next FVA[J+1]. Thus, rather than a multi-cycle fetch address loop as exists in the embodiment of FIG. 4, there effectively exists a single-cycle fetch address loop within the FBPU 1102, which is made possible by the presence of the SCP 1001 single-cycle hashed index loop, as described above.

Figure 14:
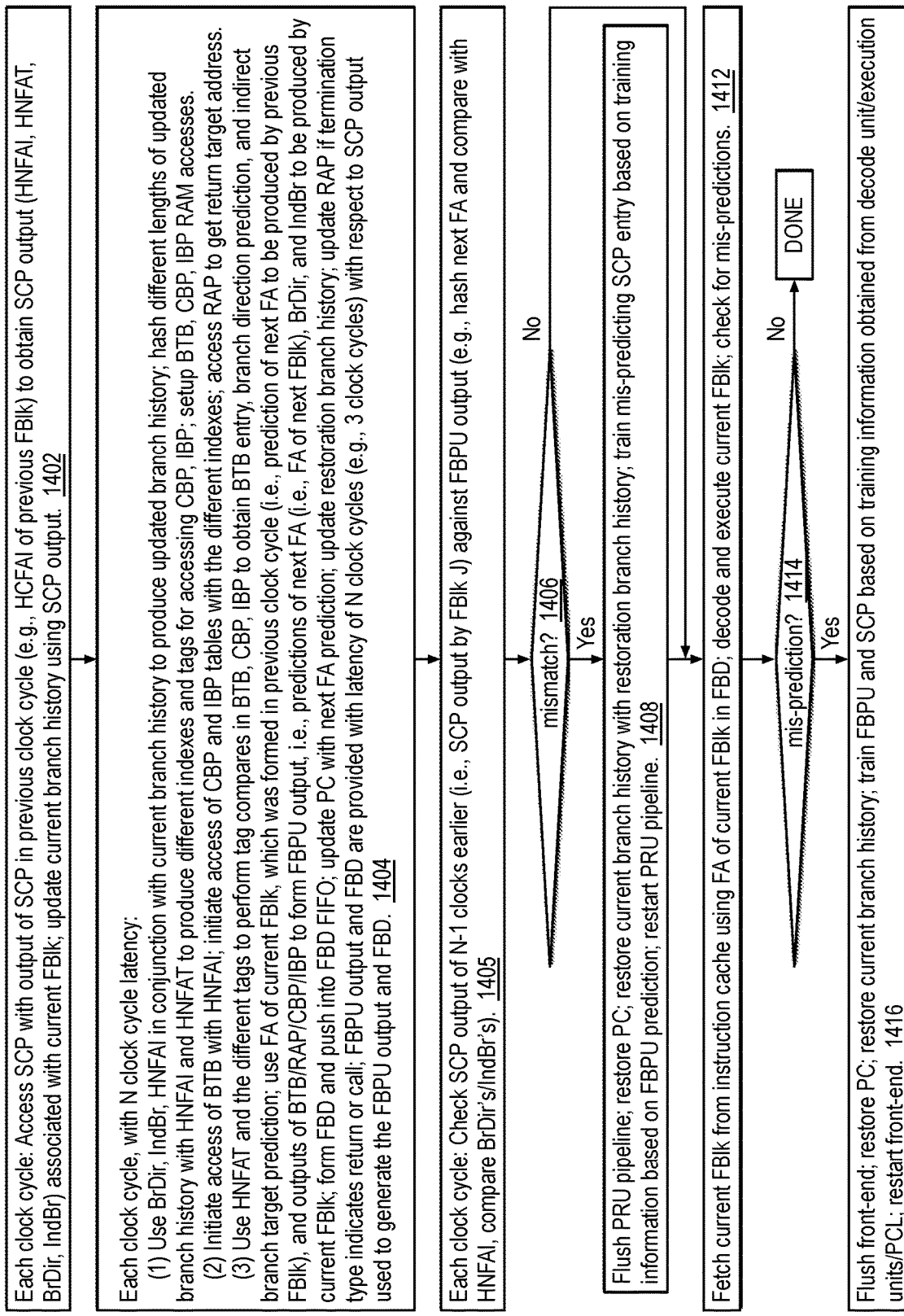
FIG. 14 is an example flow diagram illustrating operation of the prediction unit of FIG. 11 and its pipeline of FIG. 12 in accordance with embodiments of the present disclosure.

FIG. 14 is an example flow diagram illustrating operation of the PRU 102 of FIG. 11 and its pipeline of FIG. 12 in accordance with embodiments of the present disclosure.

At block 1402, each clock cycle the SCP 1001 is accessed with the output 1005 of the SCP 1001, or at least a portion thereof, in the previous clock cycle, to obtain the output 1005 associated with a current FBlk, i.e., produced by the previous FBlk that immediately precedes the current FBlk in program execution order. The obtained output is referred to in FIG. 11 as HNFAI[J−1], HNFAT[J−1], BrDir-S[J−1], and IndBr-S[J−1]. In one embodiment, eleven bits of thirteen bits of the HNFAI are fed back to mux 1171. That is, the SCP 1001 is accessed with a hash of the fetch address of the previous FBlk. Additionally, each clock cycle, the current branch history 1105 is updated using the SCP 1001 output 1005, as described above. Operation proceeds to block 1404.

At block 1404, each clock cycle, the FBPU 1102 performs the following operations with a latency of N clock cycles, where N is at least one. First, the FBPU 1102 uses the HNFAI[J−1], BrDir-S[J−1], and IndBr-S[J−1], in conjunction with the current branch history 1105, to generate an updated branch history, as described above. Additionally, different lengths of the updated branch history are hashed with the HNFAI[J−1] and HNFAT[J−1] to produce different indexes (e.g., 1131 and 1133 of FIG. 11) and tags (e.g., 1132 and 1134 of FIG. 11) for accessing the CBP 1142 and IBP 1144. Still further, the BTB 152 RAMs are setup using the HNFAI[J−1], and the CBP 1142 and IBP 1144 RAMs are setup using the different indexes. Second, the accesses to the BTB 152, CBP 1142, and IBP 1144 setup earlier are initiated. Additionally, the RAP 1146 is accessed to obtain the prediction of the return target address 446. Third, the HNFAT[J−1] and the different tags are used to perform tag comparisons in the BTB 152, CBP 1142, and IBP 1144 to obtain the BTB entry 422-434, the branch direction prediction 442, and the indirect branch target address prediction 444. Additionally, the fetch address of the current FBlk (e.g., current FVA 412 of FIG. 11) formed in the previous clock cycle (e.g., as next FVA 449 of FIG. 11, which is a prediction of the next fetch address produced by the previous FBlk) and the predictions made by the BTB 152, CBP 1142, IBP 1144, and RAP 1146 are used to form the FBPU 1102 output (e.g., 1199 of FIG. 11). The FBPU 1102 output includes predictions of a next fetch address (e.g., next FVA[J] 449), branch direction (e.g., BrDir-F[J]), and indirect branch indicator (e.g., IndBr-F[J]) to be produced by the current FBlk when subsequently fetched and executed. Still further, a FBD (e.g., FBD 452 of FIG. 11) is formed (e.g., by FBD formation logic 406 of FIG. 11) and pushed into the FBD FIFO 104. Additionally, the program counter (e.g., PC 191 of FIG. 11) is updated with the predicted next fetch address, the restoration branch history 1107 is updated as described above, and the RAP 1146 is updated if the current FBlk is terminated by a return or call instruction. The FBPU 1102 output 1199 and the FBD 452 are provided with a latency of N clock cycles relative to the SCP 1001 output 1005 that was used to generate the FBPU 1102 output 1199 and the FBD 452. Operation proceeds to block 1405.

At block 1405, each clock cycle, the FBPU 1102 prediction 1199 generated in a given clock cycle is used to check the SCP 1001 prediction 1005 generated N−1 clock cycles earlier. More specifically, the prediction of the next FVA 449 produced by a FBlk is hashed (in the same manner that a fetch address is hashed for writing into the HNFAI 902 of an SCP entry 900) and the result is compared against prediction made by the SCP 1001 N−1 clock cycles earlier of the HNFAI produced by the FBlk; the prediction of the BrDir-F produced by the FBlk is compared against the prediction made by the SCP 1001 N−1 clock cycles earlier of the BrDir-S produced by the FBlk; and the prediction of the IndBr-F produced by the FBlk is compared against the prediction made by the SCP 1001 N−1 clock cycles earlier of the IndBr-S produced by the FBlk. Operation proceeds to decision block 1406.

At decision block 1406, if a mismatch was detected in block 1405, operation proceeds to block 1408; otherwise, operation proceeds to block 1412.

At block 1408, the PRU 102 pipeline is flushed in response to the detection of the mis-prediction by the SCP 1001 at block 1406. That is, results flowing down the pipeline are invalidated, and the pipeline is stalled until its restart, which is described below. The PC 191 is restored (e.g., by the control logic 1103 of FIG. 11) with the correction PC 1113 of FIG. 11. In one embodiment, previous values of the PC 191 are saved by the SCP prediction check logic 1108 to facilitate restoration of the PC 191. The current branch history 1105 is restored with the restoration branch history 1107. The SCP entry 900 that made the mis-prediction is trained—assuming the useful bit 912 is false, as described above—with training information based on the FBPU 1102 prediction 1199 (e.g., FBPU-based training information 1187 of FIG. 11), which is assumed to be more accurate than the SCP 1001 prediction 1005. The FBPU-based training information 1187 includes the BrDir-F and IndBr-F predicted by the FBPU 1102 used to check the SCP 1001 prediction at block 1405, and the next FVA 449 predicted by the FBPU 1102 that may be hashed (i.e., a HNFAI and a HNFAT) by the control logic 1103 and written into the mis-predicting SCP entry 900. The FBPU-based training information 1187 also includes the current FVA 412, which is the current FBlk fetch address that may be hashed to generate the HCFAI that may be used as the input 1003 to the SCP 1001 (e.g., provided on training index 1179 of FIG. 11) to select the mis-predicting SCP entry 900. In an alternate embodiment, the hashes themselves of the next FVA 449 and current FVA 412 are included in the FBPU-based training information. In an alternate embodiment, the SCP prediction check logic 1108 receives a piped-down version of the HCFAI that was used to perform the lookup in the SCP 1001 and includes the HCFAI in the FBPU-based training information 1187 for use by the control logic 1103 to output on the training index 1179 to train the mis-predicting entry 900 of the SCP 1001. Finally, the PRU 102 pipeline is restarted as follows. In one embodiment, the PRU 102 also includes a mux (not shown in FIG. 11) whose output is coupled to the input of the FBPU 1102. The mux receives the output 1005 of the SCP 1001 and also receives a restart output (not shown in FIG. 11) from the control logic 1103. The restart output includes the HNFAI, HNFAT, BrDir-F and IndBr-F included in the FBPU-based training information 1187. The control logic 1103 provides the restart output to the mux (not shown) and causes the mux to select the restart output for provision to the FBPU 1102 (rather than the output 1005 of the SCP 1001). In one embodiment, the SCP 1001 is effectively skipped on the first clock cycle when restarting the PRU 102 pipeline, and the restart HNFAI provided to the mux as part of the restart output in the first restart clock cycle is fed back through mux 1171 as the SCP 1001 input 1003 for the second restart clock cycle.

At block 1412, the FBlk described by the FVA 312 of the FBD pushed into the FBD FIFO in block 1404. Subsequently, the instructions of the fetched FBlk are decoded and executed (e.g., by DEC 112 and execution units 114). Finally, the results of the decode and execution of the instructions of the FBlk are used to check whether the FBPU 1102 predictions made in block 1404 were incorrect. Operation proceeds to decision block 1414.

At decision block 1414, if a mis-prediction at block 1412 was detected, operation proceeds to block 1416.

At block 1416, the front-end 110 is flushed. Additionally, the PC 191 and the current branch history 1105 are restored using values provided by the DEC 112, execution units 114, or PCL 132 (e.g., execution-based training information 1185 of FIG. 11). Still further, the SCP entry 900 implicated by the mis-predicted FBlk is trained using the execution-based training information 1185. Finally, the front-end 110 is restarted, which includes restarting the PRU 102 similar to the manner described above with respect to block 1408.

In one embodiment, the FBPU misprediction penalty (e.g., 25 clock cycles) is much larger than the SCP misprediction penalty (e.g., 4 clocks). So, even though the SCP mis-prediction rate may be higher than the FBPU misprediction rate, as long as the SCP mis-prediction rate is not too much higher than the FBPU mis-prediction rate, the embodiments that include the SCP may achieve higher instructions per clock (IPC) than conventional solutions that have a high prediction accuracy but only generate fetch block descriptors at a rate of 1/N per clock cycle where N is greater than one, or that generate fetch block descriptors at a rate of 1 per clock cycle but as a result have a relatively low prediction accuracy.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A predictor, comprising:
   a memory comprising:
      a plurality of entries, wherein each of the plurality of entries comprises a prediction of:
         a hash of a next fetch address produced by a fetch block J of a series of successive fetch blocks in program execution order; and
         a branch direction produced by the fetch block J; and
      an output; and
      an input that selects an entry of the plurality of entries for provision on the output;
   wherein at least a portion of the output is fed back to the input such that the output provides the prediction of the hash of the next fetch address and the branch direction produced by each fetch block of the series of successive fetch blocks over a series of successive clock cycles; and
   wherein the hash of the next fetch address produced by the fetch block J is insufficient for use by an instruction fetch unit to fetch from an instruction cache a fetch block J+1 of the series of successive fetch blocks, whereas the next fetch address produced by the fetch block J is sufficient for use by the instruction fetch unit to fetch from the instruction cache the fetch block J+1.

2. The predictor of claim 1,
   wherein the hash of the next fetch address produced by the fetch block J is usable to initiate a lookup in one or more predictors of a prediction unit that provides a prediction of a next fetch address produced by the fetch block J+1.

3. The predictor of claim 2,
   wherein the one or more predictors comprises a branch target buffer.

4. The predictor of claim 2, further comprising:
   a shift register configured to hold a current global branch history;
   wherein for each clock cycle of the series of successive clock cycles:
      the current global branch history and the branch direction of the entry selected for output are used to form an updated global branch history usable in conjunction with the hash of the next fetch address to initiate the lookup; and
      the branch direction of the selected entry is shifted into the shift register.

5. The predictor of claim 2, further comprising:
   a shift register configured to hold a current path history;
   wherein the one or more predictors comprises a conditional branch predictor; and
   wherein for each clock cycle of the series of successive clock cycles:
      the current path history and one or more bits of the hash of the next fetch address of the entry selected for output are used to form an updated path history usable in conjunction with the hash of the next fetch address to initiate the lookup in the conditional branch predictor; and
      the one or more bits of the hash of the next fetch address are shifted into the shift register.

6. The predictor of claim 2,
   wherein each of the plurality of entries further comprises:
      an indicator that predicts whether the previous fetch block is terminated by an indirect branch instruction.

7. The predictor of claim 6, further comprising:
a shift register configured to hold a current indirect path history;
wherein the one or more predictors comprises an indirect branch predictor; and
wherein for each clock cycle of the series of successive clock cycles in which the indicator predicts that the previous fetch block is terminated by an indirect branch instruction:
   the current indirect path history and one or more bits of the hash of the next fetch address of the entry selected for output are used to form an updated indirect path history usable in conjunction with the hash of the next fetch address to initiate the lookup in the indirect branch predictor; and
   the one or more bits of the hash of the next fetch address are shifted into the shift register.

8. The predictor of claim 2,
wherein each of the plurality of entries further comprises:
   a second hash of the fetch address of the current fetch block for use as a tag, wherein the first hash and the second hash are of at least partially different sets of bits of the fetch address.

9. The predictor of claim 8,
wherein at least one of the one or more predictors is arranged in a set-associative manner;
wherein the lookup comprises:
   using the hash of the next fetch address to select a set in the set-associative predictor; and
   using the tag in a tag comparison with tags of ways of the selected set.

10. The predictor of claim 8,
wherein the plurality of entries of the memory are arranged in a set-associative fashion as a plurality of sets each having N ways, wherein N is at least two; and
wherein each of the plurality of entries of the memory further comprises a tag comprising a hash of the fetch address of fetch block J.

11. The predictor of claim 1,
wherein the hash of the next fetch address is further hashed with a virtual machine identifier.

12. The predictor of claim 1,
wherein the hash of the next fetch address is further hashed with a privilege mode.

13. A method, comprising:
with respect to a memory comprising:
   a plurality of entries, wherein each of the plurality of entries comprises a prediction of:
      a hash of a next fetch address produced by a fetch block J of a series of successive fetch blocks in program execution order; and
      a branch direction produced by the fetch block J; and
   an output; and
   an input that selects an entry of the plurality of entries for provision on the output:
feeding back at least a portion of the output to the input such that the output provides the prediction of the hash of the next fetch address and the branch direction produced by each fetch block of the series of successive fetch blocks over a series of successive clock cycles;
wherein the hash of the next fetch address produced by the fetch block J is insufficient for use by an instruction fetch unit to fetch from an instruction cache a fetch block J+1 of the series of successive fetch blocks, whereas the next fetch address produced by the fetch block J is sufficient for use by the instruction fetch unit to fetch from the instruction cache the fetch block J+1.

14. The method of claim 13, further comprising:
using the hash of the next fetch address produced by the fetch block J to initiate a lookup in one or more predictors of a prediction unit that provides a prediction of a next fetch address produced by the fetch block J+1.

15. The method of claim 14,
wherein the one or more predictors comprises a branch target buffer.

16. The method of claim 14, further comprising:
wherein the predictor further comprises a shift register configured to hold a current global branch history; and
for each clock cycle of the series of successive clock cycles:
   using the current global branch history and the branch direction of the entry selected for output to form an updated global branch history usable in conjunction with the hash of the next fetch address to initiate the lookup; and
   shifting the branch direction of the selected entry into the shift register.

17. The method of claim 14, further comprising:
wherein the predictor further comprises a shift register configured to hold a current path history; and
wherein the one or more predictors comprises a conditional branch predictor; and
for each clock cycle of the series of successive clock cycles:
   using the current path history and one or more bits of the hash of the next fetch address of the entry selected for output to form an updated path history usable in conjunction with the hash of the next fetch address to initiate the lookup in the conditional branch predictor; and
   shifting the one or more bits of the hash of the next fetch address into the shift register.

18. The method of claim 14,
wherein each of the plurality of entries further comprises:
   an indicator that predicts whether the previous fetch block is terminated by an indirect branch instruction.

19. The method of claim 18, further comprising:
wherein the predictor further comprises a shift register configured to hold a current indirect path history;
wherein the one or more predictors comprises an indirect branch predictor; and
for each clock cycle of the series of successive clock cycles in which the indicator predicts that the previous fetch block is terminated by an indirect branch instruction:
   using the current indirect path history and one or more bits of the hash of the next fetch address of the entry selected for output to form an updated indirect path history usable in conjunction with the hash of the next fetch address to initiate the lookup in the indirect branch predictor; and
   shifting the one or more bits of the hash of the next fetch address into the shift register.

20. The method of claim 14,
wherein each of the plurality of entries further comprises:
   a second hash of the fetch address of the current fetch block for use as a tag, wherein the first hash and the second hash are of at least partially different sets of bits of the fetch address.

21. The method of claim 20,
wherein at least one of the one or more predictors is arranged in a set-associative manner;
wherein the lookup comprises:

using the hash of the next fetch address to select a set in the set-associative predictor; and using the tag in a tag comparison with tags of ways of the selected set.

22. The method of claim 20, wherein the plurality of entries of the memory are arranged in a set-associative fashion as a plurality of sets each having N ways, wherein N is at least two; and wherein each of the plurality of entries of the memory further comprises a tag comprising a hash of the fetch address of fetch block J.

23. The method of claim 13, wherein the hash of the next fetch address is further hashed with a virtual machine identifier.

24. The method of claim 13, wherein the hash of the next fetch address is further hashed with a privilege mode.

25. A non-transitory computer-readable medium having instructions stored thereon that are capable of causing or configuring a predictor comprising:

a memory comprising:

a plurality of entries, wherein each of the plurality of entries comprises a prediction of:

a hash of a next fetch address produced by a fetch block J of a series of successive fetch blocks in program execution order; and a branch direction produced by the fetch block J; and an output; and an input that selects an entry of the plurality of entries for provision on the output;

wherein at least a portion of the output is fed back to the input such that the output provides the prediction of the hash of the next fetch address and the branch direction produced by each fetch block of the series of successive fetch blocks over a series of successive clock cycles; and wherein the hash of the next fetch address produced by the fetch block J is insufficient for use by an instruction fetch unit to fetch from an instruction cache a fetch block J+1 of the series of successive fetch blocks, whereas the next fetch address produced by the fetch block J is sufficient for use by the instruction fetch unit to fetch from the instruction cache the fetch block J+1.

\* \* \* \* \*